United States Patent
Shipman et al.

(10) Patent No.: US 10,876,607 B2
(45) Date of Patent: Dec. 29, 2020

(54) FRONT GEAR CHANGER

(71) Applicant: SRAM, LLC, Chicago, IL (US)

(72) Inventors: Christopher Shipman, Chicago, IL (US); Brian Jordan, Highland Park, IL (US); Mark Santurbane, Colorado Springs, CO (US)

(73) Assignee: SRAM, LLC, Chicago, IL (US)

( * ) Notice: Subject to any disclaimer, the term of this patent is extended or adjusted under 35 U.S.C. 154(b) by 367 days.

(21) Appl. No.: 15/794,590

(22) Filed: Oct. 26, 2017

(65) Prior Publication Data

US 2018/0045283 A1 Feb. 15, 2018

Related U.S. Application Data

(62) Division of application No. 13/755,040, filed on Jan. 31, 2013, now Pat. No. 9,890,838.

(60) Provisional application No. 61/715,658, filed on Oct. 18, 2012.

(51) Int. Cl.
*F16H 9/06* (2006.01)
*B62M 9/132* (2010.01)

(52) U.S. Cl.
CPC ............... *F16H 9/06* (2013.01); *B62M 9/132* (2013.01)

(58) Field of Classification Search
CPC .................................. F16H 9/06; B62M 9/132
See application file for complete search history.

(56) References Cited

U.S. PATENT DOCUMENTS

| 4,606,306 A * | 8/1986 | Caron ................... F02P 19/021 123/145 A |
| 5,387,000 A * | 2/1995 | Sato ........................ B62M 19/00 280/216 |
| 5,470,277 A * | 11/1995 | Romano ................. B62M 9/122 474/110 |
| 5,653,649 A * | 8/1997 | Watarai .................. B62M 9/122 474/78 |
| 6,204,775 B1 | 3/2001 | Kubacsi |

(Continued)

FOREIGN PATENT DOCUMENTS

| CN | 1660660 | 8/2005 |
| CN | 1689901 | 11/2005 |

(Continued)

OTHER PUBLICATIONS

Non-Patent Literature Thread: "Trimming the Gears?" Emily_in_nc posted Sep. 19, 2005, (http://forums.teamestrogen.com/showthread.php?t=4032&s=62af51a5c5df7dcee1d4edfca47acf9b). (Year: 2005).*

(Continued)

*Primary Examiner* — Thomas E Worden

(57) ABSTRACT

An electromechanical front gear changer for a bicycle is provided, the bicycle having a chain, including a base member attachable to the bicycle. A linkage is movably coupled to the base member. A chain guide is movably coupled to the linkage for contacting the chain. A motor is supported by the base member. A gear transmission is driven by the motor to move the linkage. A CPU is provided for controlling the motor and a power supply is supported by the base member to power the motor and the CPU. A manually operated device is disposed on the electromechanical front gear changer.

4 Claims, 21 Drawing Sheets

(56) References Cited

U.S. PATENT DOCUMENTS

| | | | | |
|---|---|---|---|---|
| 6,459,890 B1* | 10/2002 | Kim | ................ | G04G 17/00 368/204 |
| 6,623,389 B1* | 9/2003 | Campagnolo | ......... | B62M 9/122 474/70 |
| 7,048,659 B2* | 5/2006 | Campagnolo | ......... | B62M 9/122 474/70 |
| 7,306,531 B2* | 12/2007 | Ichida | ................ | B62M 9/122 474/70 |
| 7,614,971 B2 | 11/2009 | Fujii et al. | | |
| 7,704,173 B2* | 4/2010 | Ichida | ................ | B62M 25/08 474/80 |
| 7,761,212 B2* | 7/2010 | Takebayashi | ......... | B62M 25/08 482/57 |
| 7,835,150 B2* | 11/2010 | Degner | ................ | G06F 1/1616 361/679.58 |
| 8,162,191 B2* | 4/2012 | Tetsuka | ................ | B62J 11/00 224/441 |
| 8,655,561 B2* | 2/2014 | Kitamura | ............... | B62M 25/08 701/51 |
| 8,688,040 B2* | 4/2014 | Jung | ................ | A42B 3/30 455/41.2 |
| 2004/0235597 A1* | 11/2004 | Guderzo | ................ | B62M 9/122 474/70 |
| 2005/0189158 A1* | 9/2005 | Ichida | ................ | B62M 9/132 180/260 |
| 2005/0192137 A1* | 9/2005 | Ichida | ................ | B62M 9/132 474/70 |
| 2005/0239587 A1 | 10/2005 | Ichida et al. | | |
| 2006/0183584 A1 | 8/2006 | Fukuda | | |
| 2006/0186158 A1* | 8/2006 | Ishikawa | ................ | B62J 11/00 224/419 |
| 2006/0186631 A1* | 8/2006 | Ishikawa | ............... | B62M 25/08 280/260 |
| 2007/0037645 A1* | 2/2007 | Ishikawa | ................ | B62M 9/132 474/80 |
| 2007/0184925 A1* | 8/2007 | Ichida | ................ | B62M 9/132 474/80 |
| 2009/0040777 A1* | 2/2009 | Palmer | ................ | B60Q 1/326 362/473 |
| 2010/0198453 A1* | 8/2010 | Dorogusker | ....... | A63B 24/0062 701/31.4 |
| 2010/0253039 A1 | 10/2010 | Buckenberger et al. | | |
| 2012/0077438 A1 | 3/2012 | Jung | | |
| 2013/0053198 A1* | 2/2013 | Smart | ................ | B62J 13/00 474/144 |
| 2014/0087901 A1* | 3/2014 | Shipman | ............... | B62M 25/08 474/82 |
| 2014/0102237 A1* | 4/2014 | Jordan | ................. | B62M 9/122 74/473.12 |

FOREIGN PATENT DOCUMENTS

| | | |
|---|---|---|
| CN | 1817735 | 8/2006 |
| CN | 1911726 | 2/2007 |
| CN | 102298830 | 12/2011 |
| CN | 101016075 | 2/2013 |
| EP | 1010612 | 6/2000 |
| EP | 1447317 | 8/2004 |
| EP | 1568589 | 8/2005 |
| EP | 1568594 | 8/2005 |
| EP | 1693294 | 8/2006 |
| EP | 1752373 | 2/2007 |
| EP | 1757517 | 2/2007 |
| EP | 1818253 | 8/2007 |
| EP | 2112060 | 10/2009 |
| EP | 2399813 | 12/2011 |
| EP | 2535254 | 12/2012 |
| TW | 201200411 | 1/2012 |

OTHER PUBLICATIONS http://www.disraeligears.co.uk/Site/MAVIC_Mektronic_-_rear_derailleur_instructions_scan_2.html Mavic Mektronic—rear derailleur instructions, scan 2 of 10 Published by Mavic, Nov. 1998 (Year: 1998).*

Emily_in_nc, "Trimming the Gears?" forums.teamestrogen.com, posted Sep. 19, 2005, (4 pages), http://forums.teamestrogen.com/showthread.php?t=4032&s=62af51a5c5df7dcee-1d4edfca47acf9b.

* cited by examiner

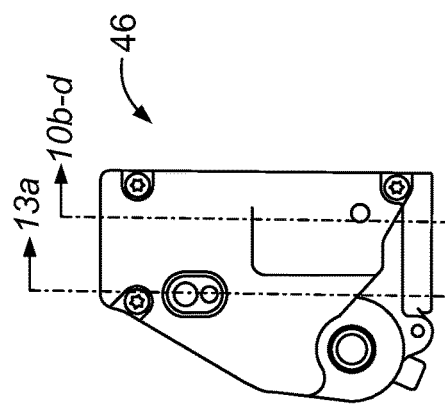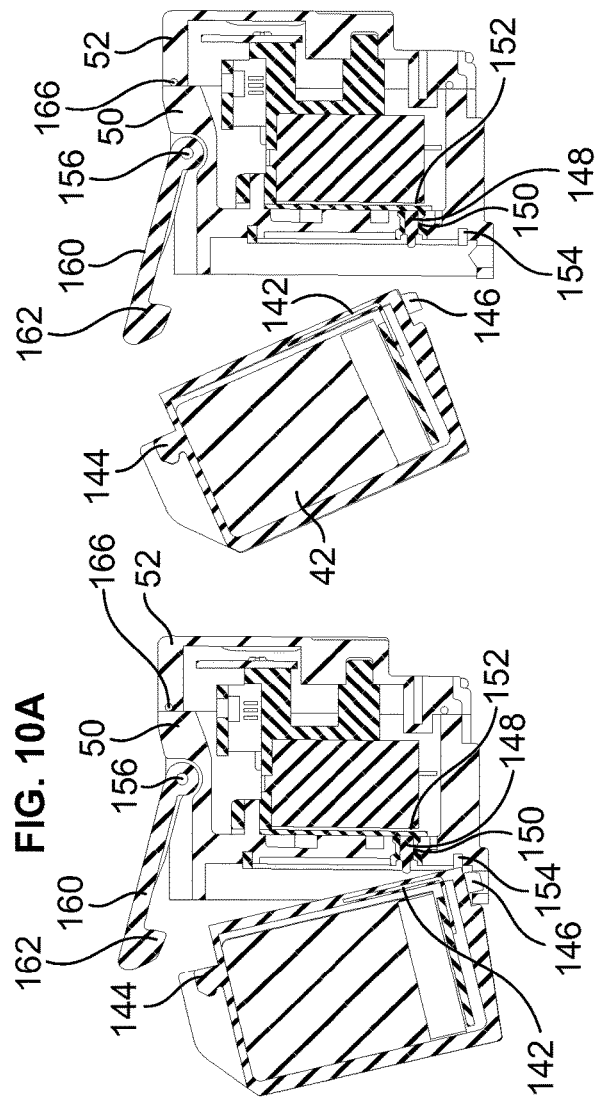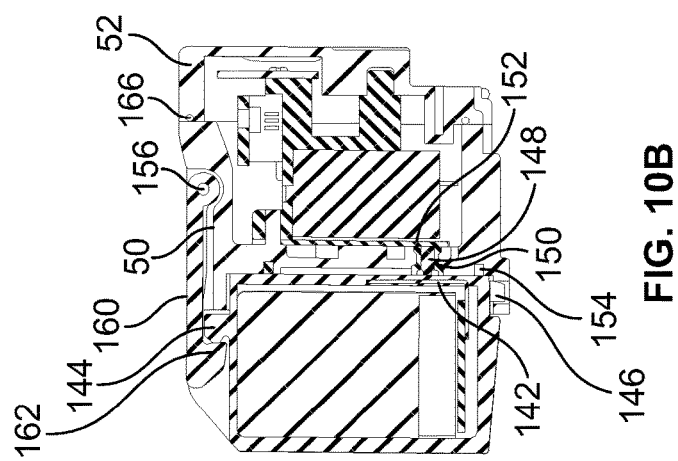

FRONT GEAR CHANGER

This application is a divisional of U.S. patent application Ser. No. 13/755,040, filed Jan. 31, 2013, which claims benefit of U.S. Provisional Patent Application No. 61/715,658, filed Oct. 18, 2012, the contents of which are herein incorporated in their entirety.

BACKGROUND OF THE INVENTION

The invention relates to bicycle gear changing systems. In particular, the invention is directed to systems including bicycle gear changers and specifically to a front gear changer. One embodiment of the invention contemplates a wireless electromechanical front gear changer.

Most of the electromechanical gear changers and systems in existence are bulky, heavy, expensive, difficult to install, and unattractive. One reason is that they communicate and are powered by wires. As a result, the manufacturers of these devices must produce and stock many different lengths of cables for the many different sizes/styles of bike frames available.

There is a need for an electromechanical gear changer that is lightweight, effective, compact, and easy to install. The invention satisfies the need.

SUMMARY OF THE INVENTION

One aspect of the invention provides an electromechanical front gear changer for a bicycle.

BRIEF DESCRIPTION OF THE SEVERAL VIEWS OF THE DRAWINGS

FIGS. 10A-D are views illustrating a battery being removed from the motor gearbox module.

DETAILED DESCRIPTION OF THE INVENTION

Embodiments of the invention will herein be described with reference to the drawings. It will be understood that the drawings and descriptions set out herein are provided for illustration only and do not limit the invention as defined by the claims appended hereto and any and all their equivalents. For example, the terms "first" and "second," "front" and "rear," or "left" and "right" are used for the sake of clarity and not as terms of limitation. Moreover, the terms refer to bicycle mechanisms conventionally mounted to a bicycle and with the bicycle oriented and used in a standard fashion unless otherwise indicated.

Figure 1:
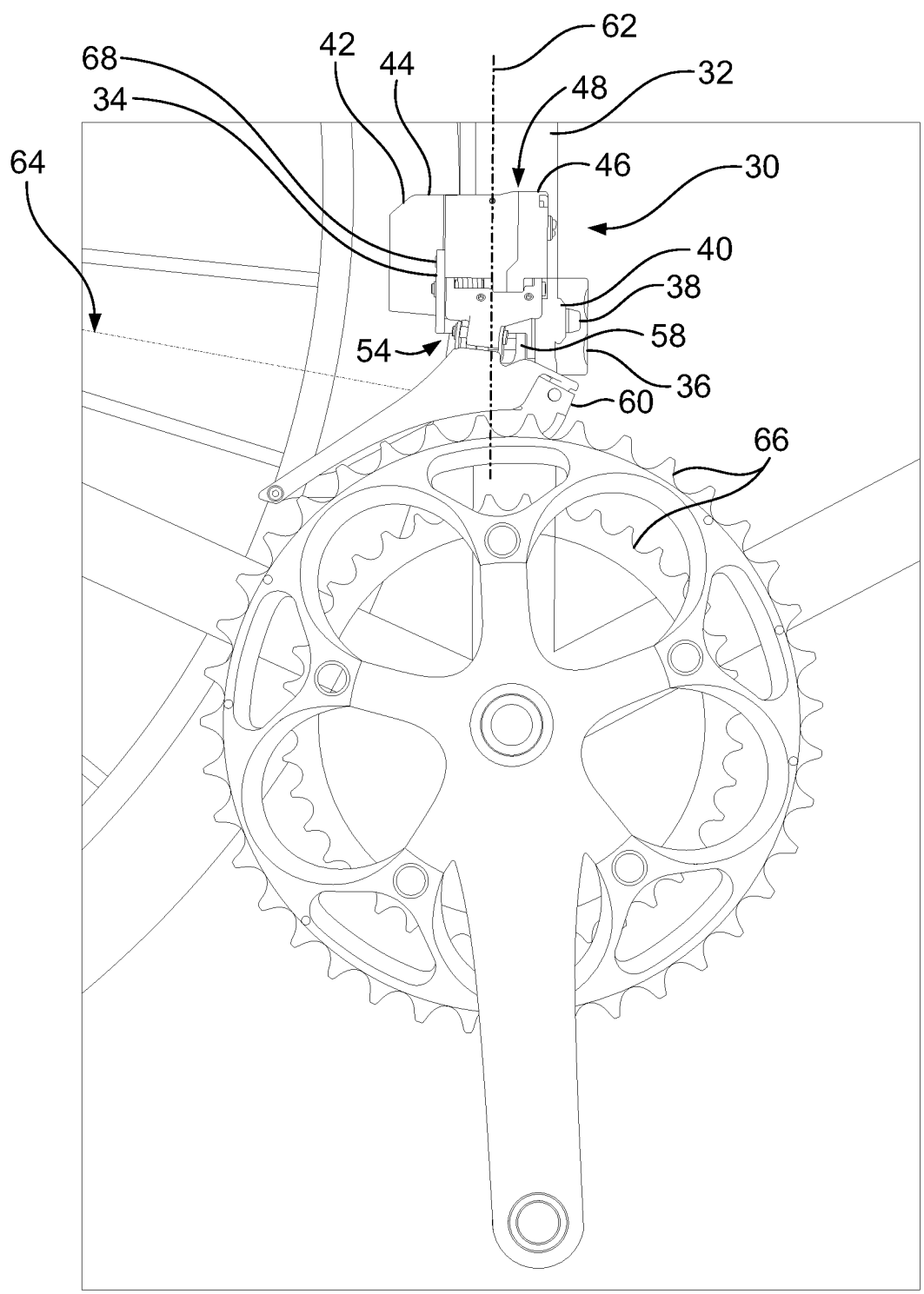
FIG. 1 is a front gear changer installed on a bicycle.

Referring to FIG. 1, an electromechanical front gear changer 30, or front derailleur according to one embodiment of the invention, may be attached to a bicycle frame 32 by connecting base member 34 of the gear changer to a front gear changer hanger 36 of the frame in a conventional manner using a fixation bolt 38 and a fixation washer 40. Alternatively, the base member 34 may include or be made attachable to a clamp, as is well known, for attaching the gear changer 30 to the bicycle frame 32.

Referring to FIGS. 1, 2, 3, and 4, the basic structure of the electromechanical front gear changer 30 includes a removable power supply, which may be in the form of a battery 42 enclosed with a power supply housing 44, which is installed on a motor gearbox module 46 attached to the base member 34. The motor gearbox module 46 may be considered to include or be enclosed at least in part within a housing 48, which may include rear and front housing portions 50, 52. The rear and front housing portions 50, 52 may be formed of a single or multiple pieces. The power supply housing 44 should present little, negligible, or no aerodynamic drag because of its position at the rear of the rear housing portion 50. The physical shape and size (form factor) of the power supply housing 44 as viewed from the front (see front view of FIG. 2B) is less than that presented by the housing 48 and thus does not contribute to the frontal area of the gear changer 30. In other words, one cannot see the power supply housing 44 from the front of the bicycle because its physical shape and size are less—when viewed from the front and looking backwards—than that presented by the housing 48 formed by housing portions 50, 52.

The base member 34 functions as one bar of what may be referred to as a four-bar linkage 54. The linkage includes an outer link 56 and an inner link 58, which are each pivotally connected to base member 34 and make up two more of the four bars in the linkage 54. A cage assembly (also known as a chain guide) 60 completes the four-bar linkage 54 by pivotally connecting to inner link 58 and connected to outer link 56 in a manner that may allow both pivotal and axial motion. In one embodiment, this linkage geometry allows chain guide 60 to rotate relative to its own yaw axis 62 and to move relative to base member 34. Other more conventional linkages are also contemplated. Bicycle chain 64 is engaged with chainrings 66 and chain guide 60 in a conventional manner and is shifted between the two rings by the movement of chain guide relative to base member 34.

Figure 2B:
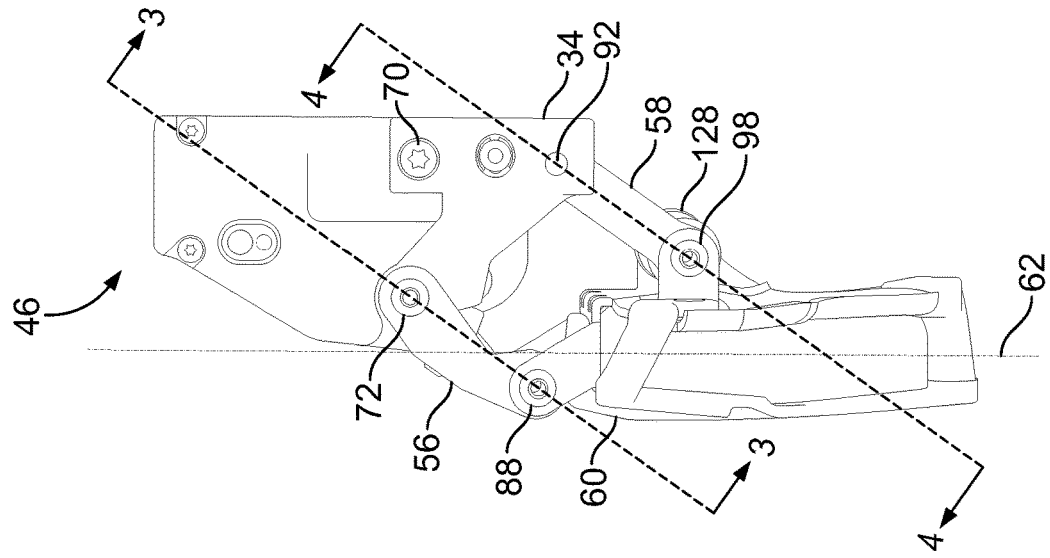
FIGS. 2A and 2B are respectively a side view and a front view of a front gear changer.
Figure 2A:
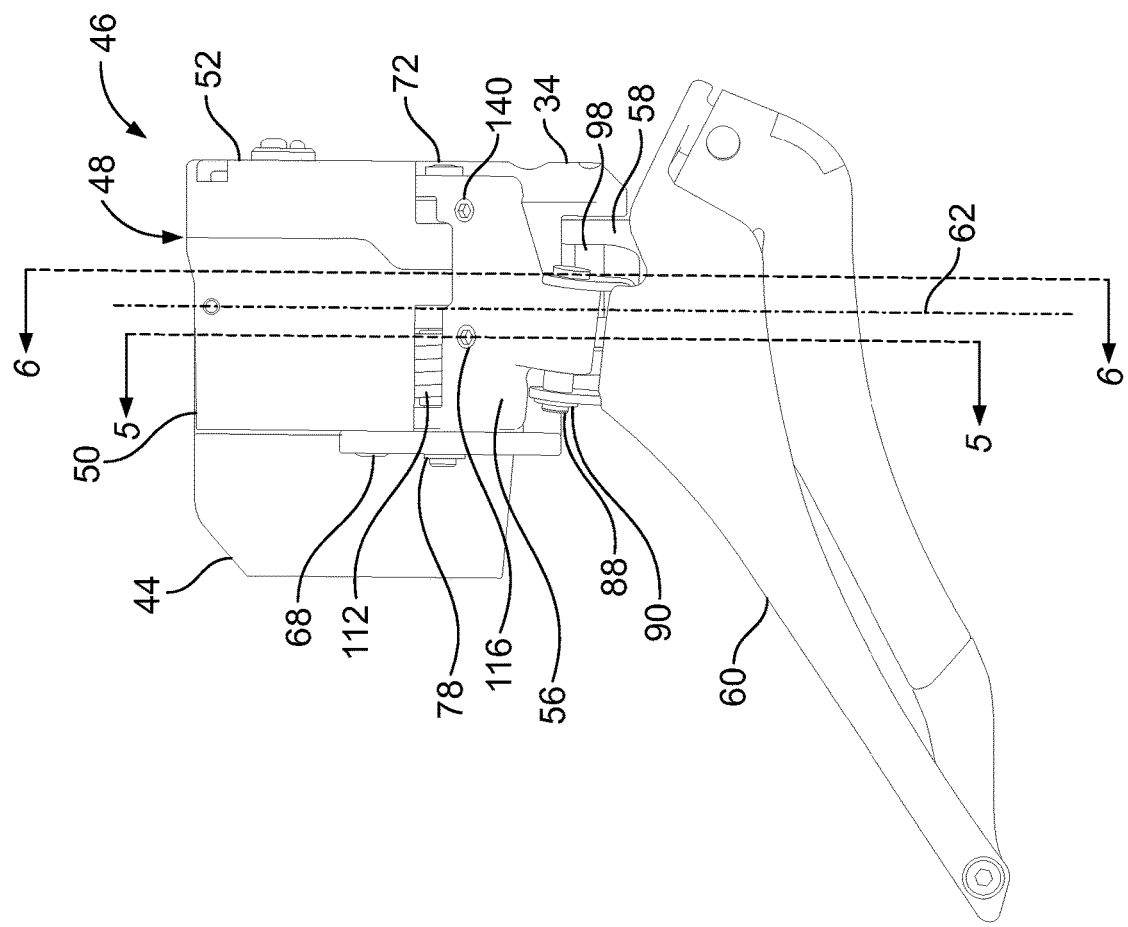

Referring to FIGS. 2A and 2B, base member 34 may be rigidly connected to the motor gearbox module 46 according to the following arrangement. Motor module to bracket rear screw 68 is received in a counter-bore thru hole in base member 34 and is also threadably engaged with a corresponding blind hole in rear housing portion 50 in motor gearbox module 46. Motor module to bracket front screw 70 is received in a second counter-bore thru hole in base member 34 and is threadably engaged with a corresponding blind hole in front housing portion 52 in motor gearbox module 46.

Referring to FIGS. 2-7, the basic details of an example of a four-bar linkage structure 54 suitable for the present invention are as follows. It will be understood that while the example linkage set out herein exhibits a yaw motion as it moves, a standard linkage that does not exhibit motion in the yaw direction could be employed. The yaw type linkage reduces or eliminates the need to trim the position of the front derailleur to accommodate the derailleur to the chain line created by the position of the chain on one of the rear sprockets. If a non-yaw linkage is employed, the invention could incorporate a feature to trim the front derailleur in response to a sensed or calculated position of the chain guide, for example.

Figure 3:
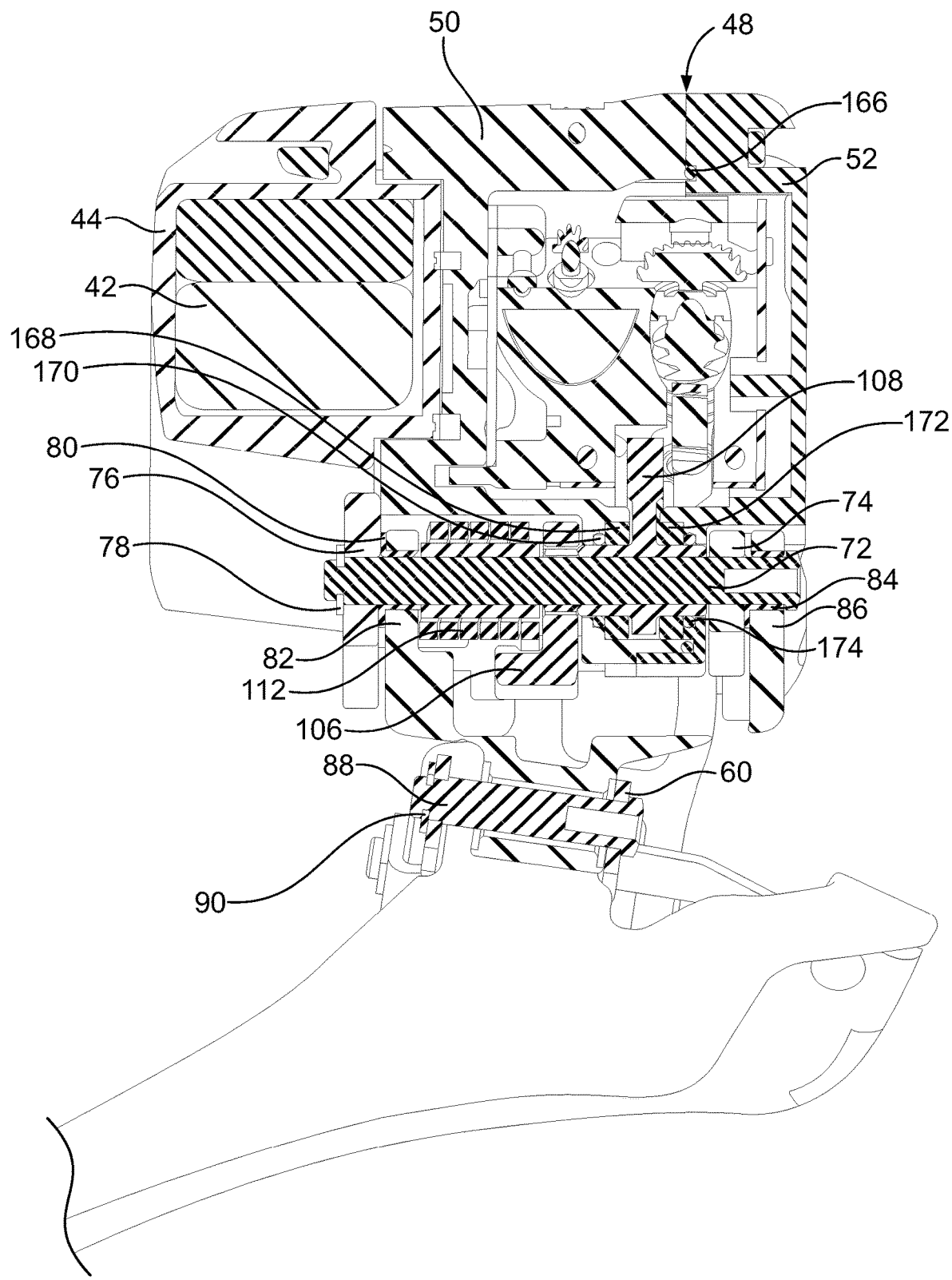
FIG. 3 is a section view along 3-3 of FIG. 2B showing the linkage.

Referring to FIG. 3, first link pin 72 is received in thru holes in base member front tab 74 and base member rear tab 76, which are formed at two spaced apart points on the base member 34. First link retaining ring 78 engages a groove in first link pin 72 and keeps first link pin from backing out of the thru holes. First link rear inner bushing 80 is received in the thru hole in outer link rear tab 82 and first link front inner bushing 84 is received in the thru hole in outer link front tab 86. First link front inner bushing 84 and first link rear inner bushing 80 are pivotally connected to first link pin 72. Thus, outer link 56 is pivotally connected to base member 34.

Second link pin 88 is received in two thru holes in chain guide 60. Second link retaining ring 90 engages a groove in second link pin 88 and keeps it from backing out of the thru holes. Outer link 56 is pivotally connected to second link pin 88 and also allows movement between it and the second link pin along its long axis. Thus, chain guide 60 is pivotally connected to outer link 56 and able to rotate relative to the yaw axis of outer link 56 (see FIG. 2).

Figure 4:
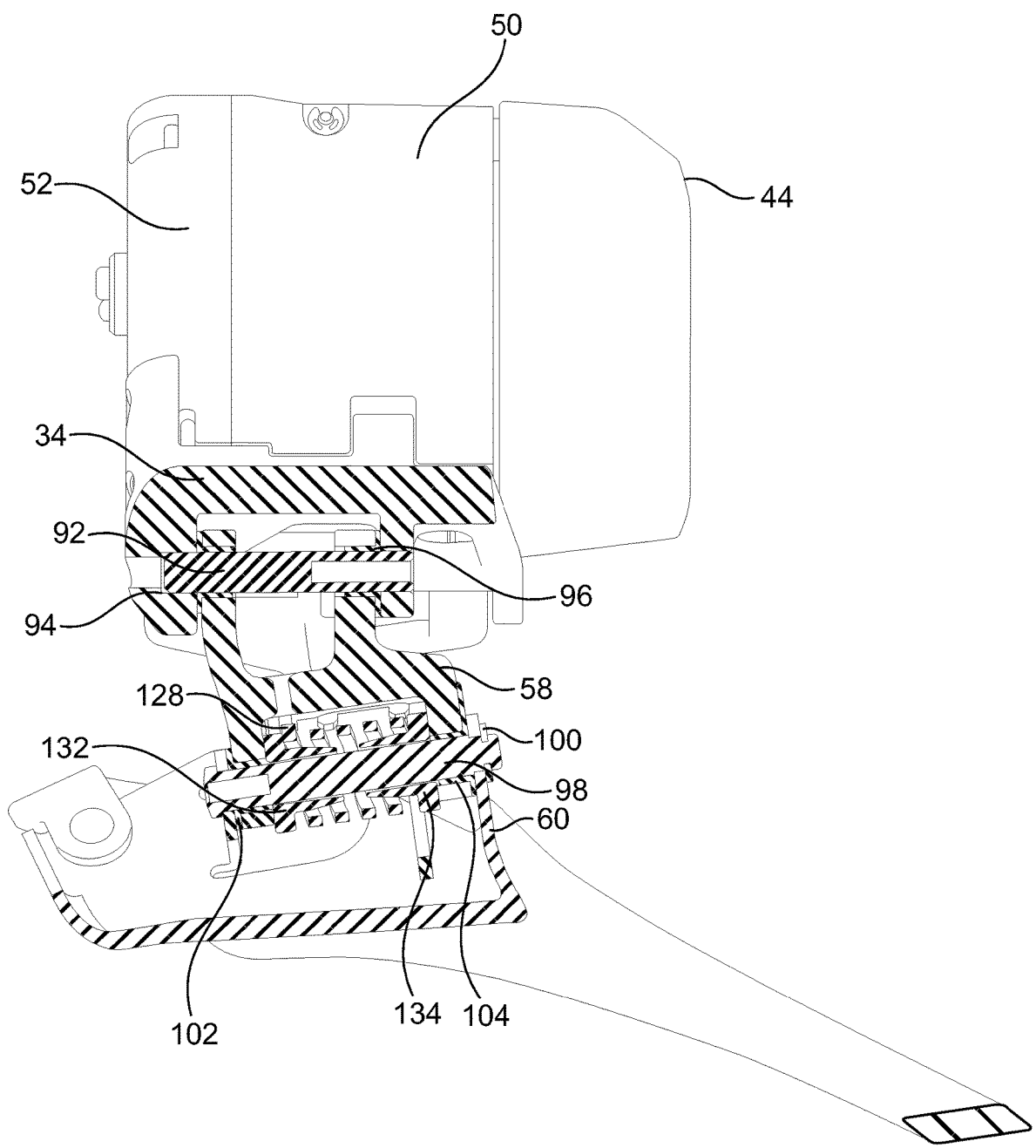
FIG. 4 is a section view along 4-4 of FIG. 2B showing the linkage.

Referring to FIG. 4, third link pin 92 may be slip-fit into a counterbore at the front end of base member 34 and received, by a press fit, in a thru hole at the rear of base member. Thus, third link pin 92 and base member 34 are rigidly connected. Third link front inner bushing 94 is received in a thru hole in inner link 58 and third link rear inner bushing 96 is received in a second thru hole in the inner link. Third link pin 92 is rotatably received in both third link front inner bushing 94 and third link rear inner bushing 96. Thus, inner link 58 is pivotally connected to base member 34. Fourth link pin 98 is received in two thru holes in chain guide 60 and prevented from backing out by fourth link retaining ring 100, which engages in a groove in fourth link pin 98. Fourth link front inner bushing 102 is received in a thru hole in inner link 58 and fourth link rear inner bushing 104 is received in another thru hole in inner link. Fourth link pin 98 is rotatably received in both fourth link front inner bushing 102 and fourth link rear inner bushing 104. Thus, inner link 58 is pivotally connected to chain guide 60 to complete the four-bar linkage. It will be understood that the illustrated linkage 54 is only one example of a number of link configurations that would be suitable for the inventive gear changer set out herein.

Figure 5:
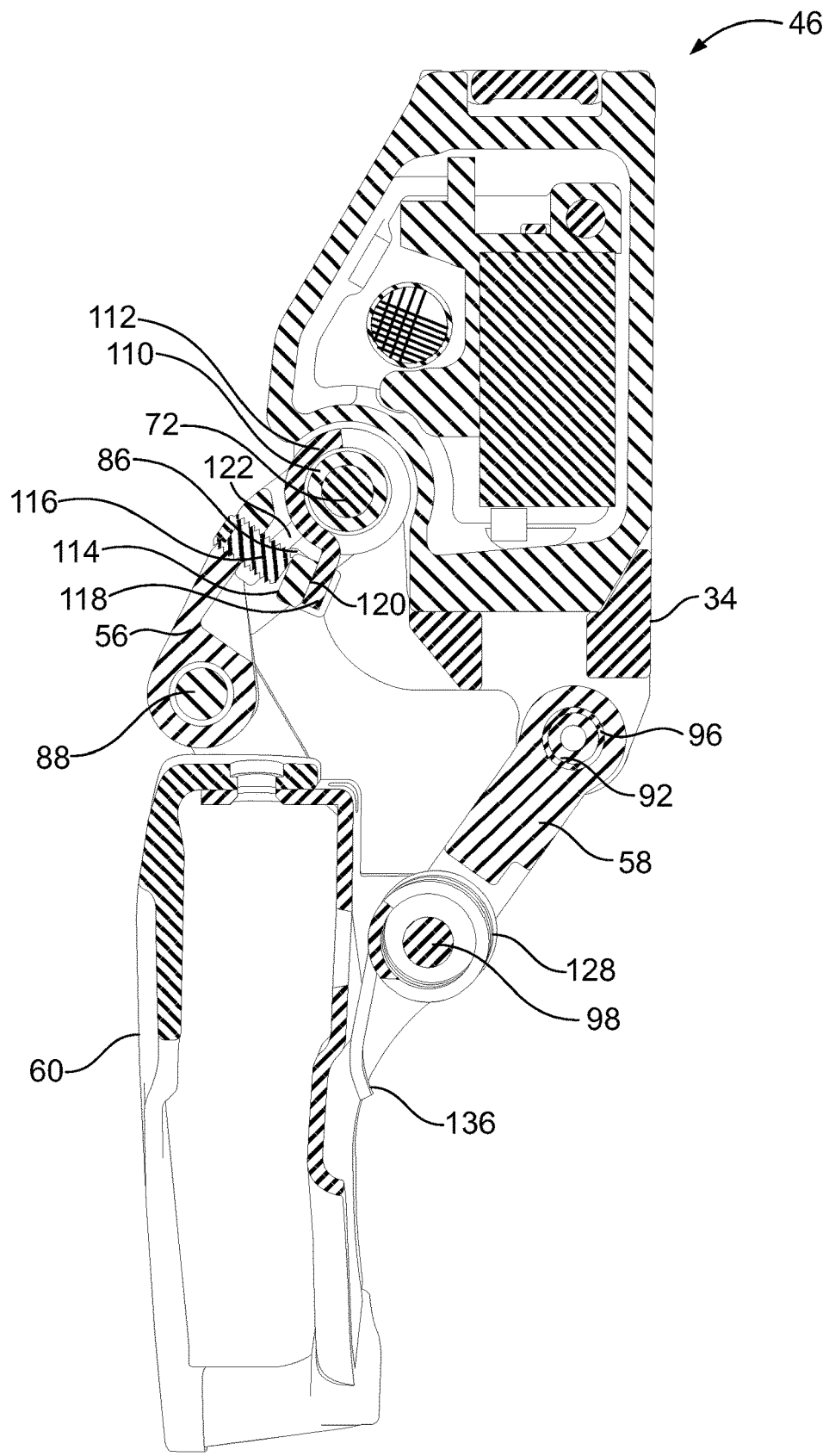
FIG. 5 is a section view along 5-5 of FIG. 2A showing a saver spring and an upper limit set screw.
Figure 9A:
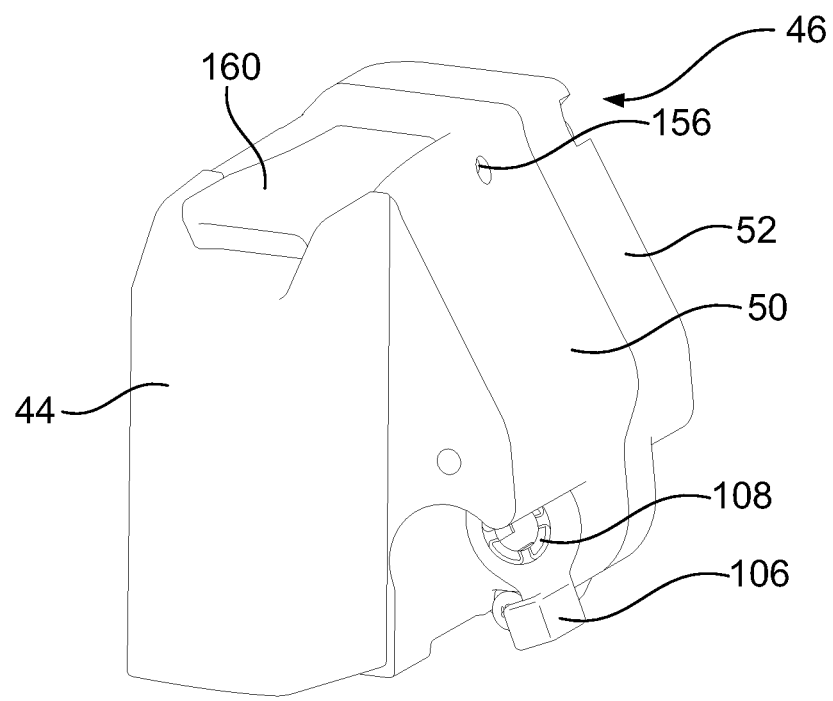
FIGS. 9A and 9B are isometric views of a motor gearbox module, one view with a battery installed (9A) and another with the battery removed (9B).
Figure 9B:
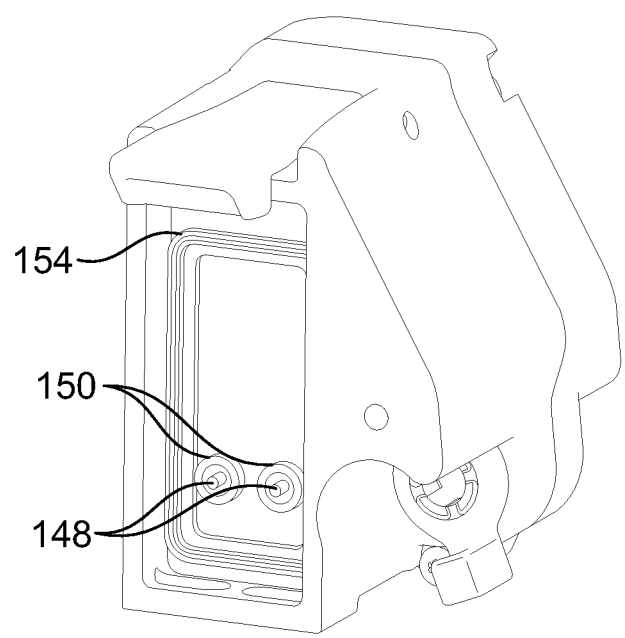

Referring to FIGS. 3, 5, and 9, first link pin 72 is also rotatably received in motor gearbox module output arm 106, sector gear 108, and saver spring bushing 110. Motor gearbox module output arm 106 and a rear tubular portion of sector gear 108 may be rigidly coupled by press fit of complementary castellation features or any suitable structure or technique. Thus, any torque on sector gear 108 about the long axis of first link pin 72 gets transferred to motor gearbox module output arm 106 about the same axis. Sector gear 108, motor gearbox module output arm 106, a first biasing element 112, e.g., a saver spring, and saver spring bushing 110 are captured at a position between portions of the outer link 56 and/or the base member 34, e.g., front tab 74 and outer link rear tab 82. An outer face 114 of motor gearbox module output arm 106 engages with upper limit set screw 116, which is threadably engaged with outer link 56. Thus, a torque on motor gearbox module output arm 106 in the direction outboard of the center plane of bicycle frame 32 (clockwise direction in FIG. 5) will translate into an outboard torque on the outer link 56. The user can set the amount of angular offset between outer link 56 and motor gearbox module output arm 106 by changing how deeply the upper limit set screw 116 is positioned in the outer link.

Saver spring bushing 110 is received in the inner diameter of first biasing element 112, for example a helical torsion spring, and thus first biasing element is able to rotate along the long axis of first link pin 72. One leg 118 at the front of saver spring 112 engages an inner wall 120 of motor gearbox module output arm 106 and urges it clockwise as shown in FIG. 5. A second leg 122 on the opposite end of saver spring 112 engages an internal wall 86 of outer link 56 and urges it in the counterclockwise direction in FIG. 5, which biases upper limit set screw 116 against motor gearbox module output arm 106 with a preload force determined by the angular offset between the two parts. Thus, a torque on motor gearbox module output arm 106 in the inboard direction as shown in FIG. 5 will translate into a torque in the inboard direction on the outer link 56 through saver spring 112.

If an external force greater than the preload force from first biasing element 112 acts upon outer link 56 to prevent it from rotating inboard, a situation seen when electromechanical front gear changer 30 attempts to downshift chain 64 under extremely high chain tension or with chainrings 66 stationary relative to chain, saver spring deflects angularly to allow motor gearbox module output arm 106 to rotate inboard. This prevents a motor stall condition inside motor gearbox module 46, which causes extra stress on the torque transferring components, i.e., parts of the transmission 126 inside motor gearbox module, and wastes energy from the power supply 42.

Figure 6:
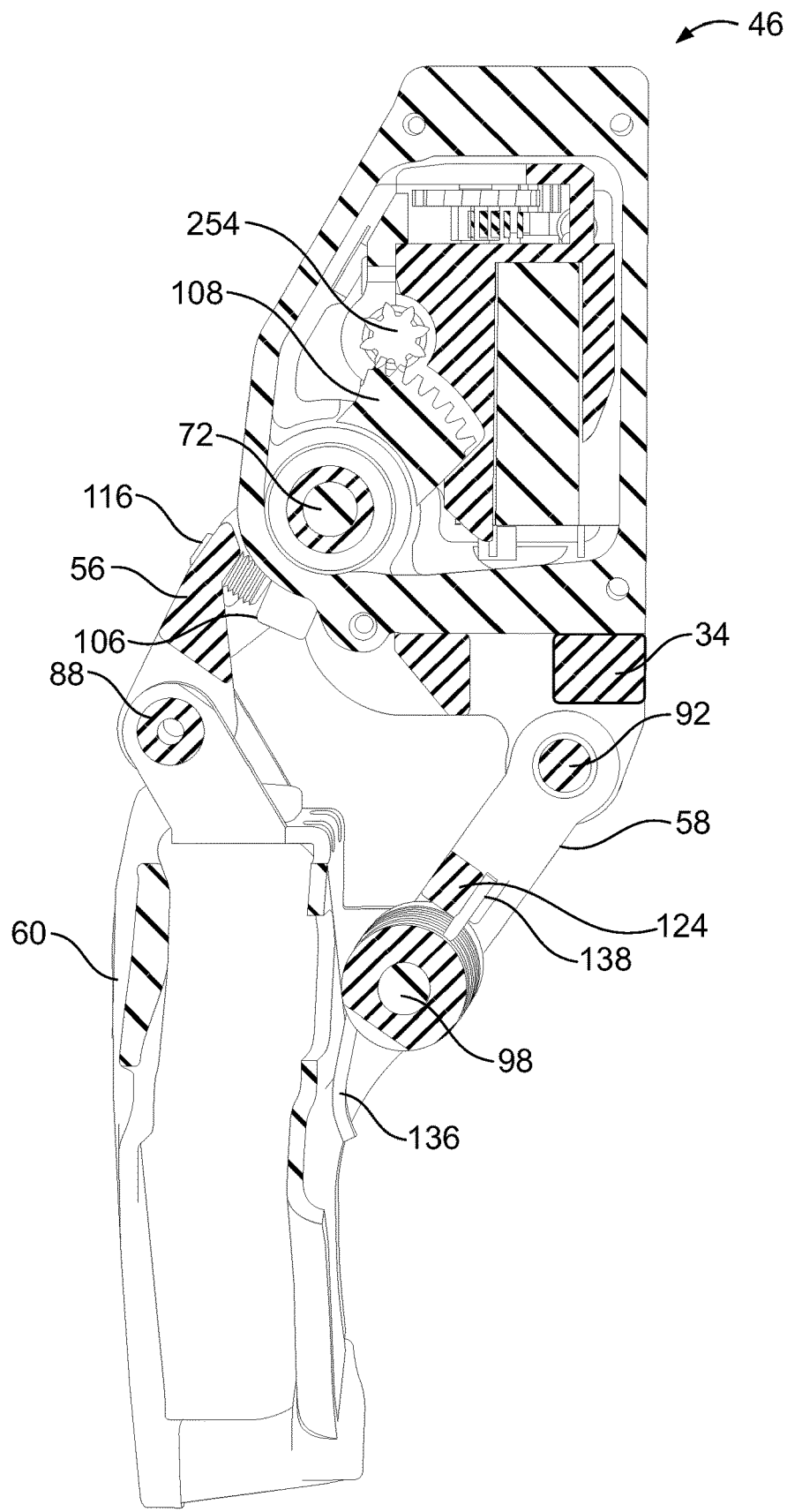
FIG. 6 is a section view along 6-6 of FIG. 2A showing a bias spring.
Figure 7B:
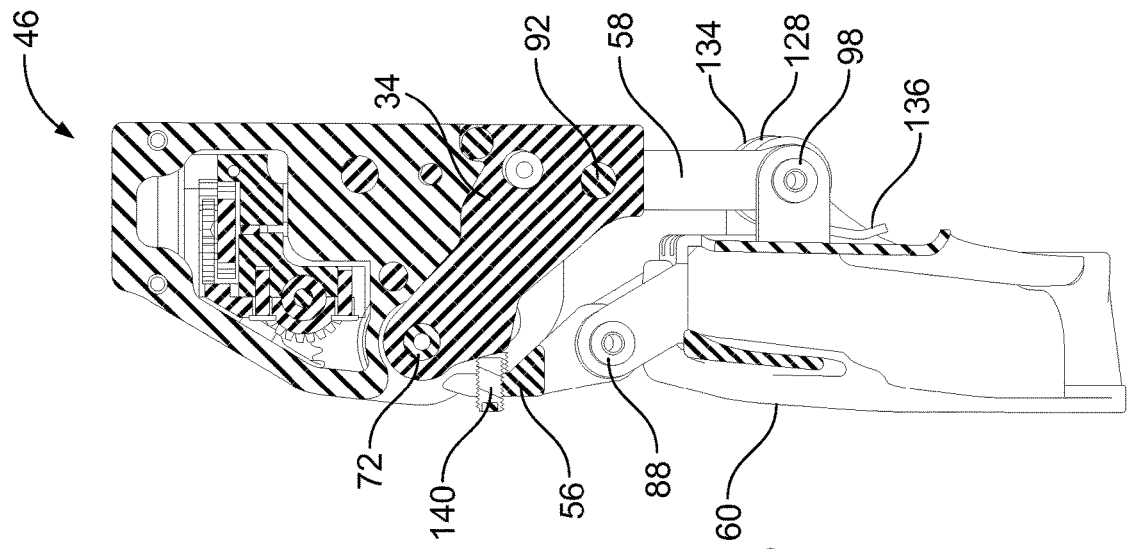
FIG. 7A is a side view and FIG. 7B is a section view of a front gear changer with the section shown in 7B taken along 7B of FIG. 7A, with both figures showing a chain guide in the extreme inboard configuration (closest to the bicycle frame).
Figure 7A:
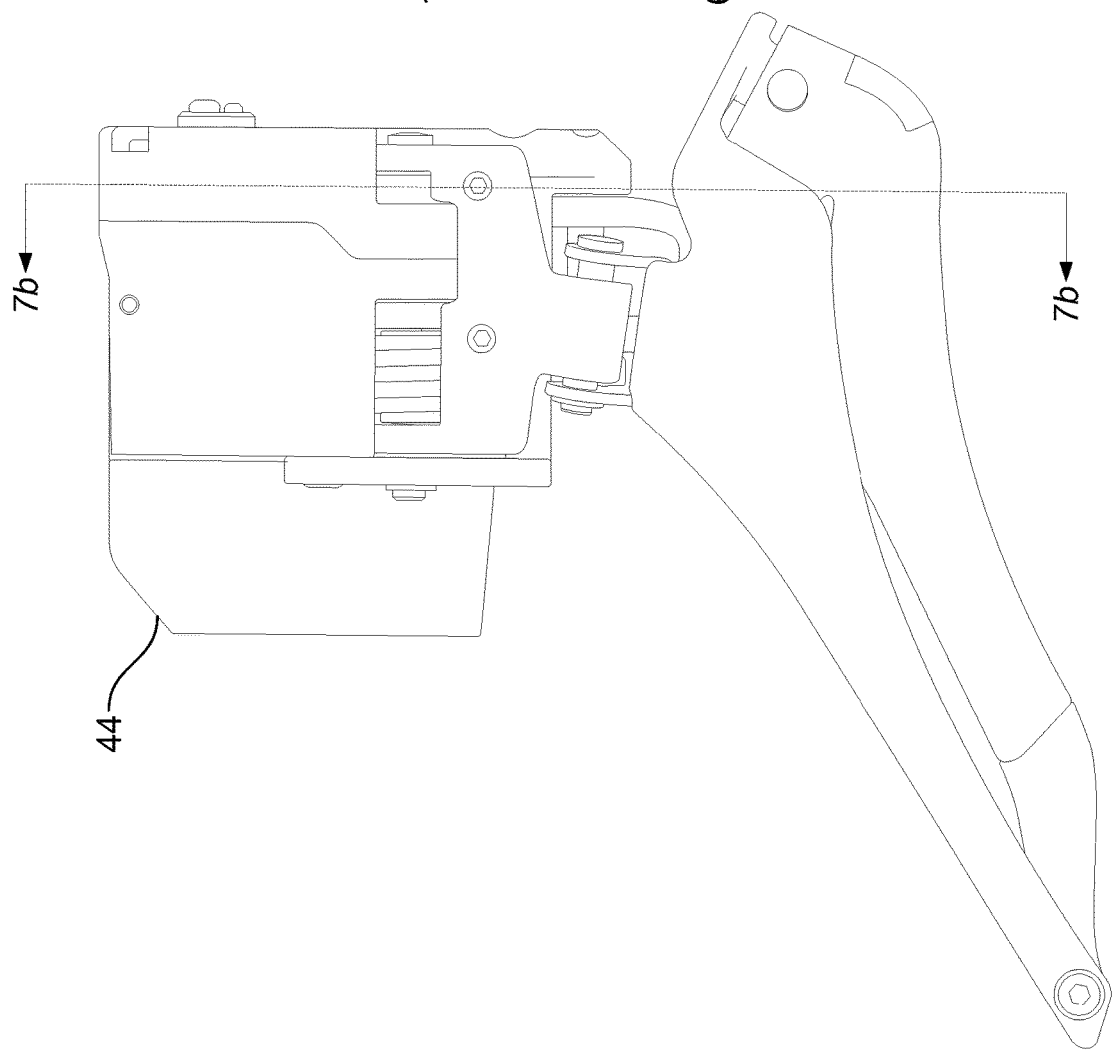
Figure 8A:
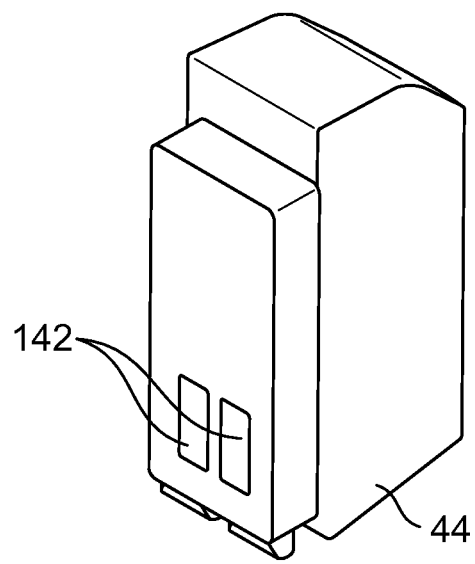
FIGS. 8A-D are respectively a perspective view, a bottom view, a front view and a sectional view of a battery/battery housing.
Figure 8B:
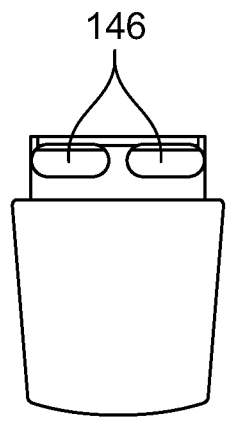
Figure 8C:
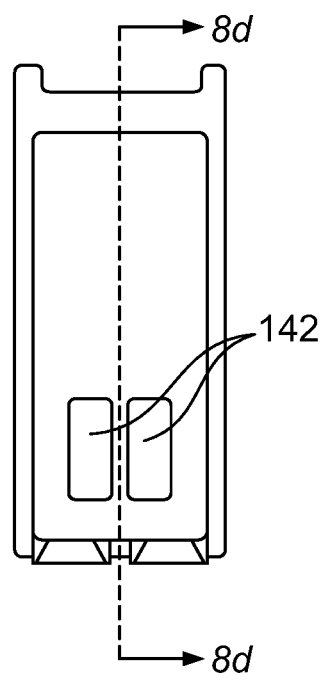
Figure 8D:
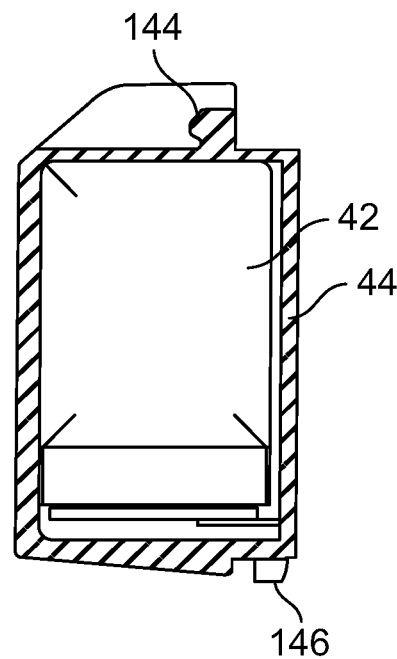

Referring to FIGS. 4, 6, 7, and 19, second biasing element 128, for example a helical torsion spring, urges the four-bar linkage in the inboard direction to eliminate play from the four-bar linkage through to stage three worm 130. Bias spring front bushing 132 and bias spring rear bushing 134 are received in either end of second biasing element 128 and fourth link pin 98 is received in both bushings. Thus, second biasing element 128 and fourth link pin 98 are pivotally connected. One end of second biasing element 136 engages chain guide 60 and urges it clockwise as shown in FIG. 6. The other end of second biasing element 138 engages an inner wall 124 of inner link 58 and urges it counterclockwise as shown in FIG. 6. In FIG. 7, second biasing element 128 has urged the four-bar linkage to its extreme inboard configuration, i.e. toward the bicycle frame. The inboard travel of the four-bar linkage 54 is limited when lower limit set screw 140 contacts an inner wall of base member 34. Because lower limit set screw 140 is threadably engaged with outer link 56, this acts as a limit of travel between outer link 56 and base member 34. The user can adjust this limit of travel by adjusting how deeply the lower limit set screw 140 is positioned in the threaded hole in outer link 56.

Referring to FIGS. 8A-D, battery 42 may be rechargeable and may be of the lithium-polymer variety. Terminals 142 may be recessed slightly below a front surface of power supply housing 44 and may be co-molded into the power supply housing. Catch 144 may be formed and located on a top surface of power supply housing 44 and projections 146 are located on a bottom surface of the battery housing.

Referring to FIGS. 9A-B, 10A-D, and 11, battery contact pins 148 are received in battery contact seals 150, which are received in thru holes in rear housing portion 50 of motor gearbox module 46. Battery contact seals 150 may be made of an elastomeric silicone material and function to form water-tight seals between battery contact pins 148 and rear housing portion 50. Battery contact pins 148 are electrically connected to the internal circuitry of PC (printed circuit) board assembly 152 and may be rigidly mounted directly to the surface of PC board assembly. The tips of battery contact pins 148 may be spring-loaded in the direction along their long axis to ensure reliable electrical connection with the terminals 142. Battery face seal 154 has a lip along its entire perimeter that is either pressed or glued into a blind groove in rear housing portion 50 to hold it in place. Battery latch pin 156 may be received in two thru holes in rear housing portion 50 and latch pin retaining ring 158 engages a groove in the battery latch pin to prevent it from backing out. Battery latch 160 rotatably receives battery latch pin 156 in one thru hole between the two thru holes in rear housing portion 50. The battery latch pin 156 could be press-fit into the rear housing portion 50. Battery latch 160 may be pivotally connected to rear housing portion 50. In the alternative, the latch 160 could be connected to the power supply housing 44 and connect to a feature provided on housing portion 50 or 52.

FIG. 10B shows power supply housing 44 installed on motor gearbox module 46. Battery latch 160 has a hooked end 162 that engages catch 144 of power supply housing 44 and prevents power supply housing travel to the left as shown in FIG. 10B. The hooked end 162 and catch 144 also prevent battery latch 160 from rotating in a clockwise direction as shown in FIG. 10B as long as there is no large external force that uncouples the hook and catch. Projections 146 of battery 26 are engaged in corresponding battery engaging holes in rear housing portion 50. Power supply housing 44 is held in an installed position that forces battery seal 154 to deform slightly, forming a water-tight seal. The deformation of battery seal 154 also causes the battery seal to exert an urging force against the front surface of power supply housing 44, urging the surface to the left in FIG. 10A. This urging force, in turn, causes catch 144 of power supply housing 44 to be urged to the left, against hook 162 of battery latch 160 and causes projections 146 of the power supply housing to be urged to the left, against battery engaging holes. In this manner, any play between power supply housing 44 and rear housing portion 50 is eliminated and the power supply housing is positively retained in motor gearbox module 46. The installed position of power supply housing 44 also forces battery contact pins 148 to compress their internal springs against battery terminals 142, creating a pressure contact between battery contact pins and battery terminals that ensures reliable conduction of electricity.

FIGS. 10B-D show a process by which the user can easily remove power supply housing 44. Referring to FIG. 10B, the user pulls the end of battery latch 160 upwards to begin the latch clockwise. Battery latch hook 162 and battery catch 144 have a ramped mating interface such that, with sufficient force from the user, battery latch hook 162 urges the battery catch and thus the entire power supply housing 44 to the right against the urging force from battery face seal 154. Once battery latch hook 162 slides past the tip of battery catch 144, battery latch 160 is free to rotate clockwise about battery latch pin 156 and battery 42 is free to pivot counterclockwise around the engagement point of projections 146 and battery engaging holes on rear housing portion 50.

Referring now to FIG. 10C-D, when power supply housing 44 has been rotated sufficiently counterclockwise, the user is able to lift power supply housing in a generally upwards motion, causing projections 146 of battery 42 to disengage from battery engaging holes of rear housing portion 50. In this manner, power supply housing 44 is removed from motor gearbox module 46. By reversing this process, the user is able to easily reinstall power supply housing 44.

Figure 11:
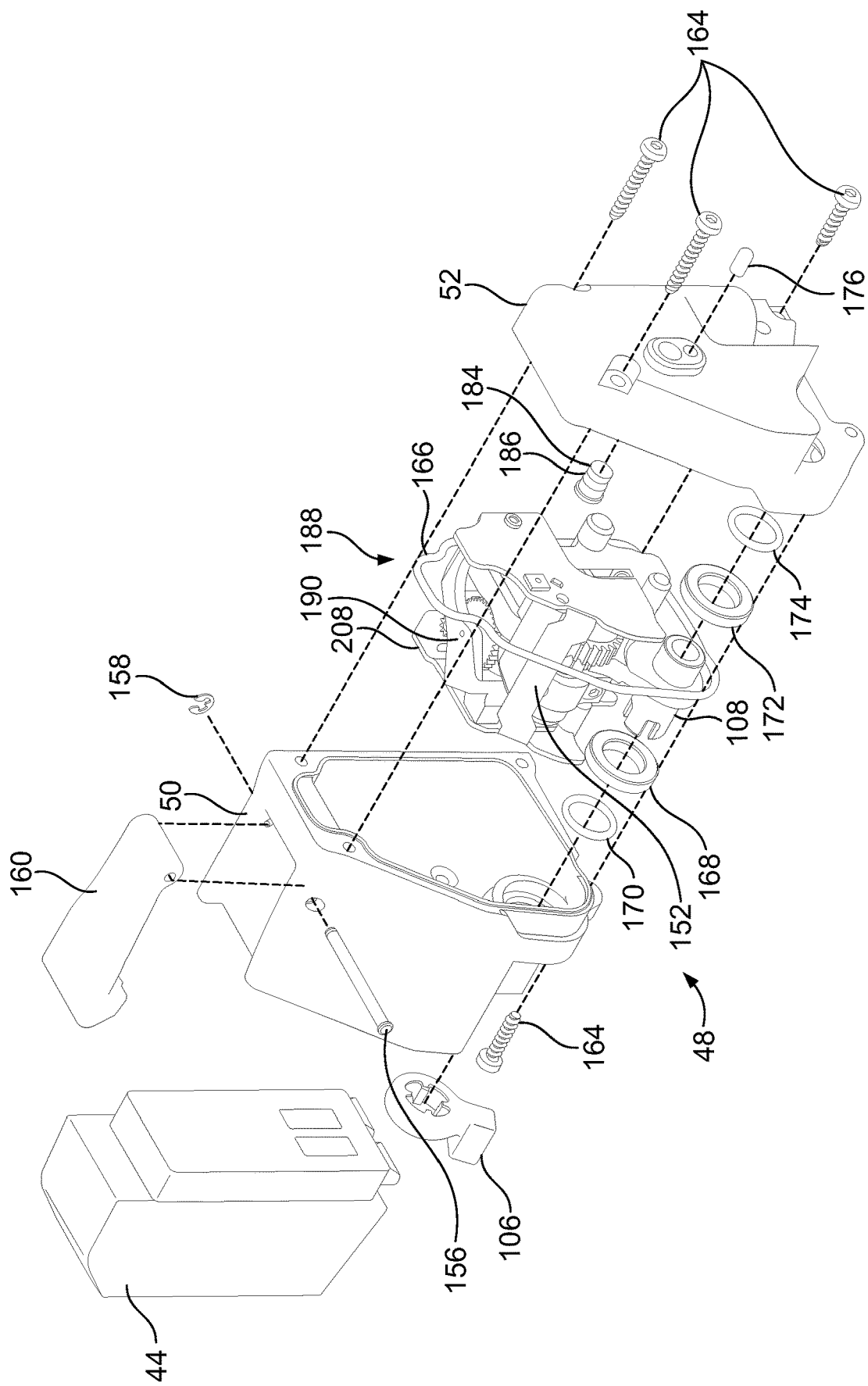
FIG. 11 is an exploded view of the motor gearbox module and battery.
Figure 12A:
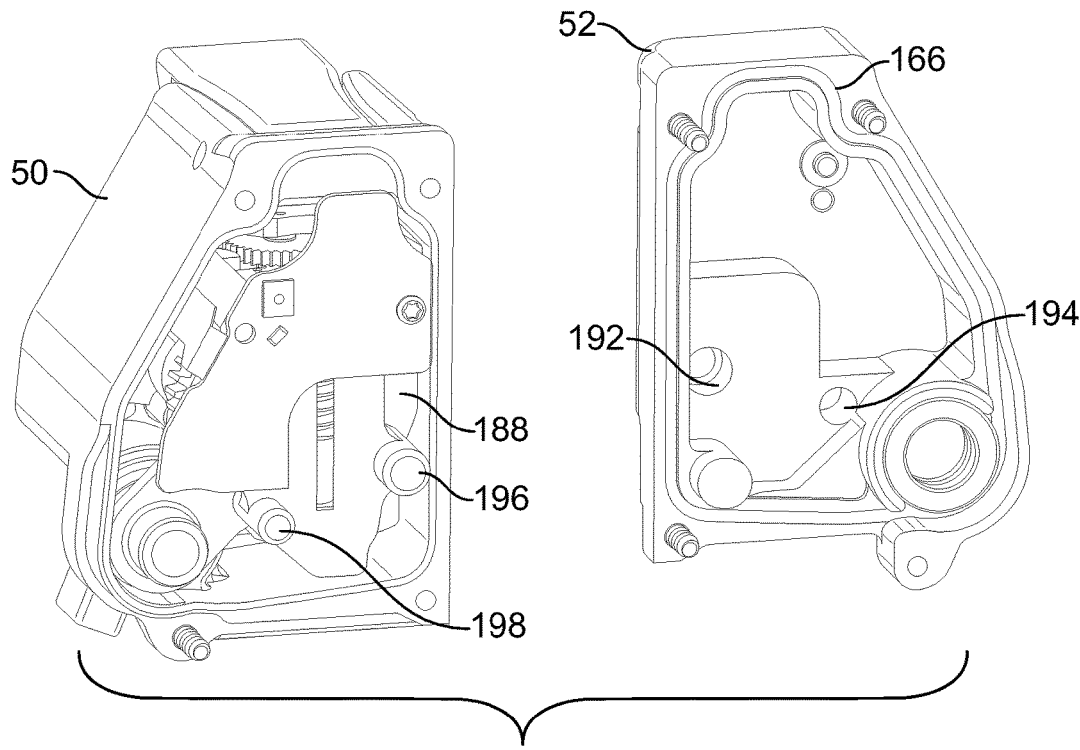
FIGS. 12A and 12B are respectively alignment features between a motor gearbox inner assembly and a rear housing portion and a front housing portion.
Figure 12B:
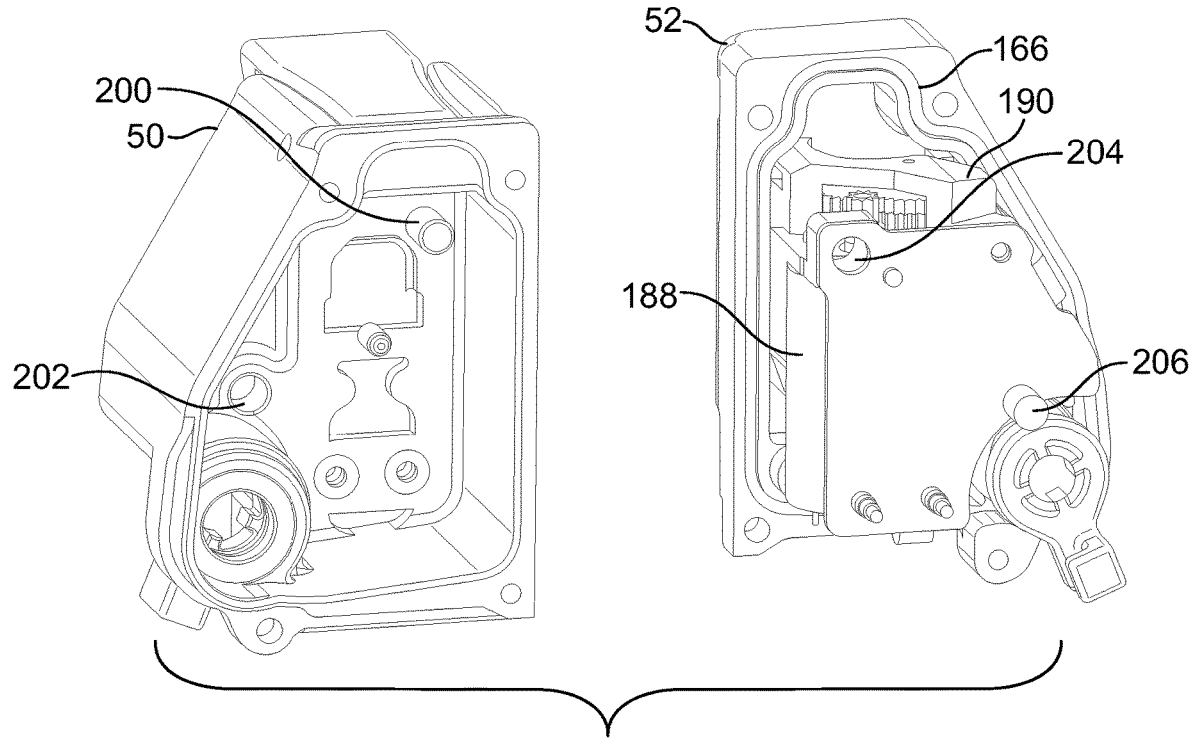

Referring to FIGS. 11 and 12, if formed as multiple pieces, the front housing portion 52 and the rear housing portion 50 may be clamped together by a plurality of (e.g., four (4)) outer housing screws 164. For example, three outer housing screws 164 are received in clearance thru holes in front housing portion 52 and threadably engaged with rear housing portion 50. One outer housing screw 164 is received in a clearance thru hole in rear housing portion 50 and threadably engaged with front housing portion 52. Housing gasket 166 may be made of an elastomeric silicone material and sits in a groove on the mating surface of front housing portion 52. Housing gasket 166 is compressed by a protrusion on rear housing portion 50 to form a water-tight seal along the outer perimeter between front housing portion 52 and rear housing portion. While the front housing portion 52 and rear housing portion 50 are shown as separate pieces, they may be considered to be made as a single piece or multiple pieces.

Referring to FIGS. 3 and 11, sector gear 108 has a rear tubular portion that extends through the inner diameters of sector gear rear bushing 168 and sector gear rear O-ring 170 and also through a thru hole in rear housing portion 50. Sector gear rear O-ring 170 may be made of an elastomeric rubber material and forms a water-tight seal between sector gear 108 and rear housing portion 50. A front tubular portion of sector gear 108 extends through the inner diameters of sector gear front bushing 172 and sector gear front O-ring 174 and also through a thru hole in front housing portion 52. Sector gear front O-ring 174 may be made of an elastomeric rubber material and forms a water-tight seal between sector gear 108 and front housing portion 52.

Figure 13A:
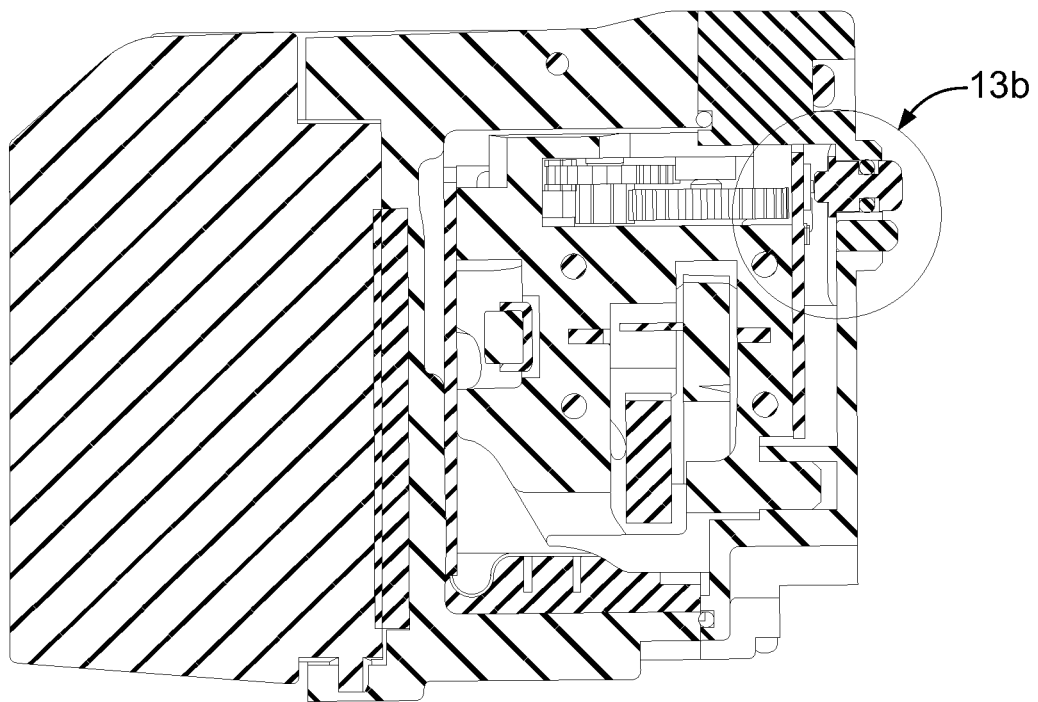
FIG. 13A is a section view along 13-13 of FIG. 10 showing a button and LED.
Figure 13B:
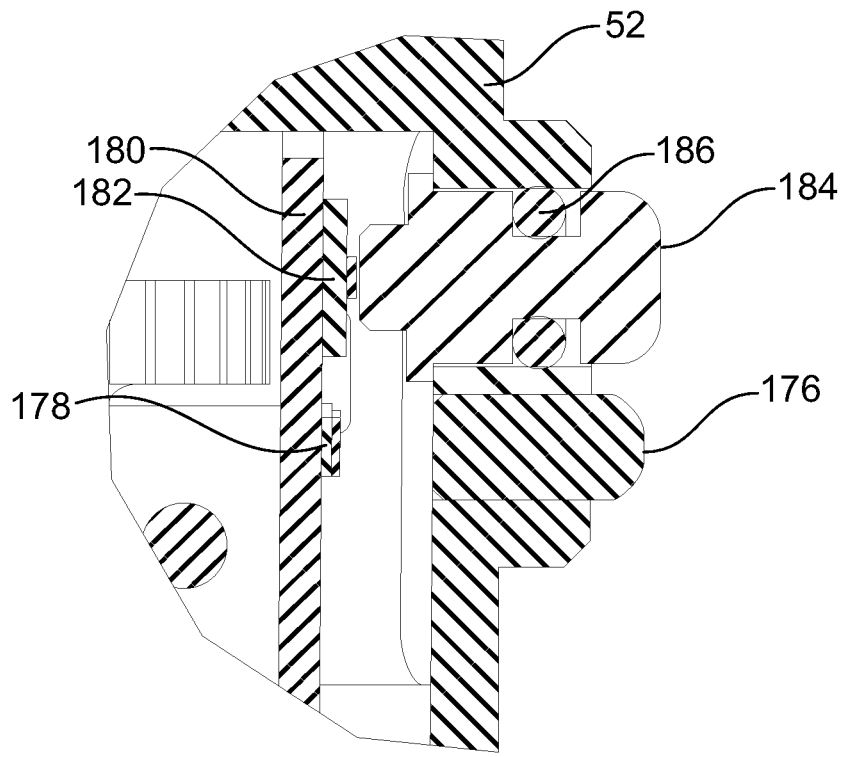
FIG. 13B is a close up view of FIG. 13A.

Referring to FIGS. 13A and 13B, LED lens 176 is press fit into a thru hole in front housing portion 52 directly adjacent to a light emitting diode, LED 178, mounted on front board 180 of PC board assembly 152. This allows light emitted by the LED to travel through front housing portion 52 to be viewable by a user. A manually operated device, such as button 182, is also mounted on the front board 180 of PC board assembly 152 and may be a momentary electrical switch. Button plunger 184 is a body of revolution that is received in a thru hole in front housing portion 52. Button plunger O-ring 186 sits in an O-ring gland of button plunger 184 and forms a water-tight seal between button plunger and front housing portion 52. When button plunger 184 is pressed by the user, it moves axially until it actuates button 182, changing its switching state. When button plunger 184 is released by the user, the internally spring-loaded button 182 urges button plunger 184 axially away from the button, which reverts to its original switching state. Button 182 may be used to change a state of the front gear changer 30. One example of a change of state includes the initiation or enablement of the process of wirelessly pairing the electromechanical front gear changer assembly 30 with its shifters (see FIG. 21). Another example might be actuating the electromechanical front gear changer assembly 30 independent of a signal from the shifters for easier servicing or other functions. The actuation via the button 182 might change the position of the chain guide 60, such as to permit or check the alignment thereof, to switch gears, or enable a trim function, for example. In the alternative, the front housing portion 52 may include a co-molded elastomeric material shaped and sized to receive the plunger 184, or provided by way of some other method, such that the over-molded material can serve as a waterproof seal for the plunger.

Referring to FIGS. 11 and 12, motor gearbox inner assembly 188 is enclosed inside the cavity created when front housing portion 52 and rear housing portion 50 are clamped together. The main structural part of motor gearbox inner assembly 188 is main inner housing 190, which includes features that align and fix the motor gearbox inner assembly to front housing portion 52 and rear housing portion 50. On front housing portion 52, inboard alignment hole 192 and outboard alignment hole 194 mate with front inboard alignment boss 196 and front outboard alignment boss 198, respectively, on main inner housing 190. On rear housing portion 50, inboard alignment boss 200 and outboard alignment hole 202 mate with rear inboard alignment hole 204 and rear outboard alignment boss 206, respectively, on main inner housing 190. Each alignment boss may be tapered along its long axis so the respective engagement with its complement alignment hole begins as a slip-fit and end as a press-fit. Alternatively, all slip-fit connections may be provided with the optional addition of providing a foam lined interior to constitute a "spring element" to one or both of the front and rear housing portions 52, 50 to cushion the components held inside and control axial movement thereof along the guide pins. Thus, main inner housing 190 is held connected to the rest of motor gearbox module 46.

Figure 14:
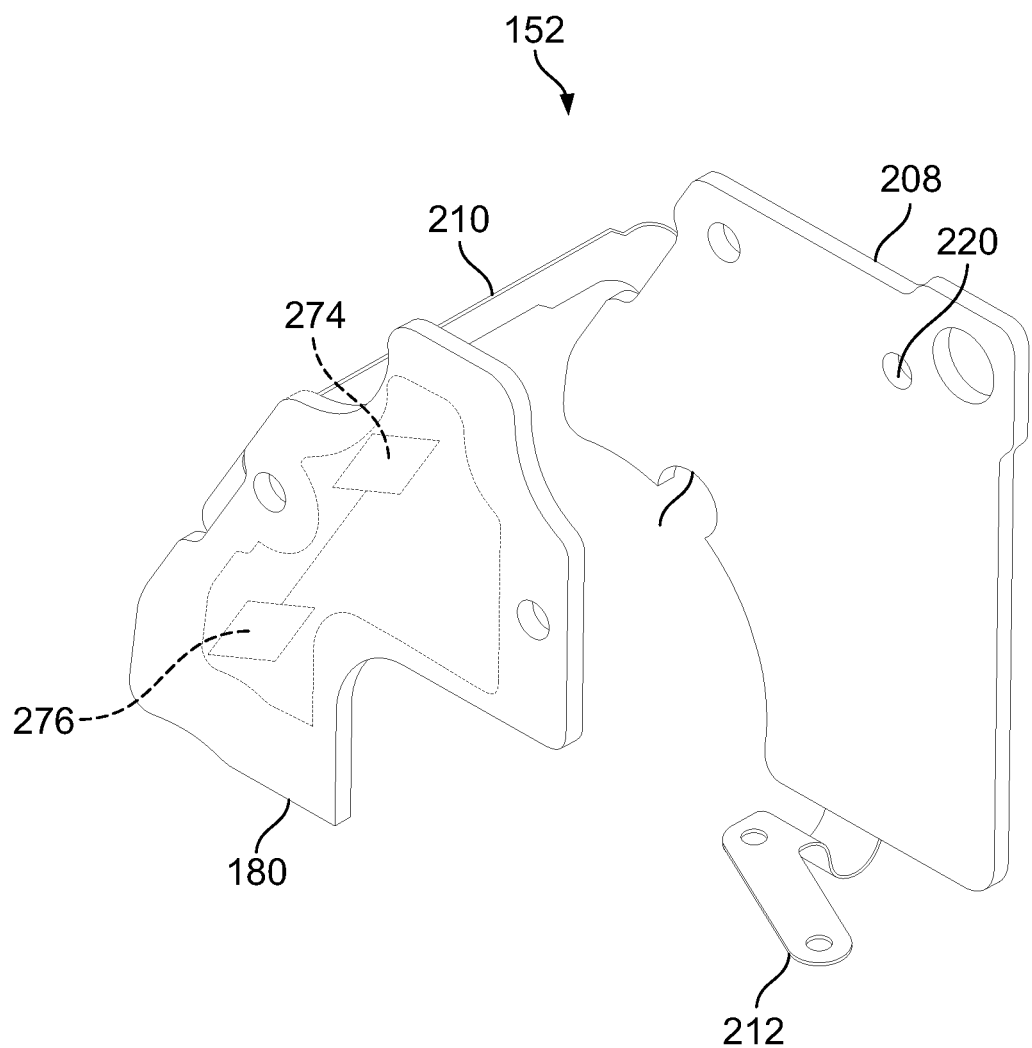
FIG. 14 is an isometric view of a PC (printed circuit) board.
Figure 15A:
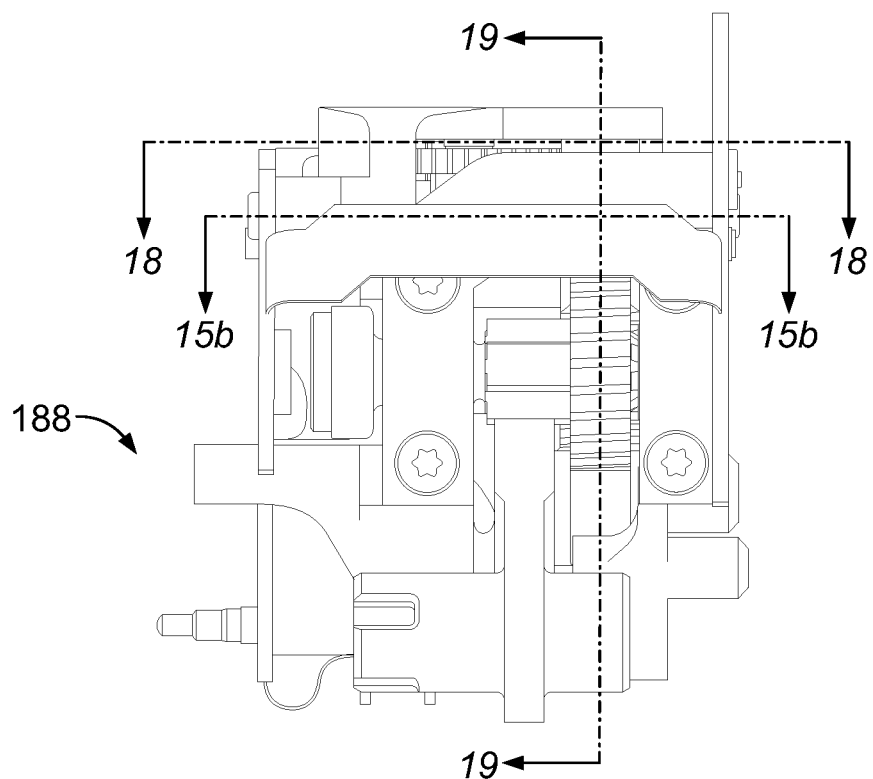
FIGS. 15A and 15B are respectively a side view and a section view of the motor gearbox inner assembly showing stage two of a gear train or transmission.
Figure 15B:
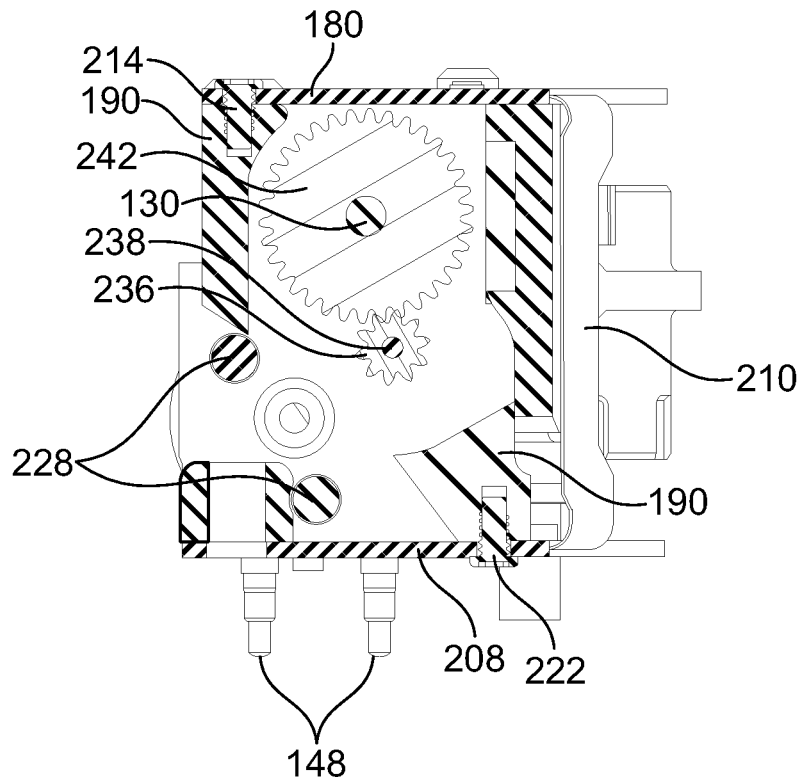
Figure 16:
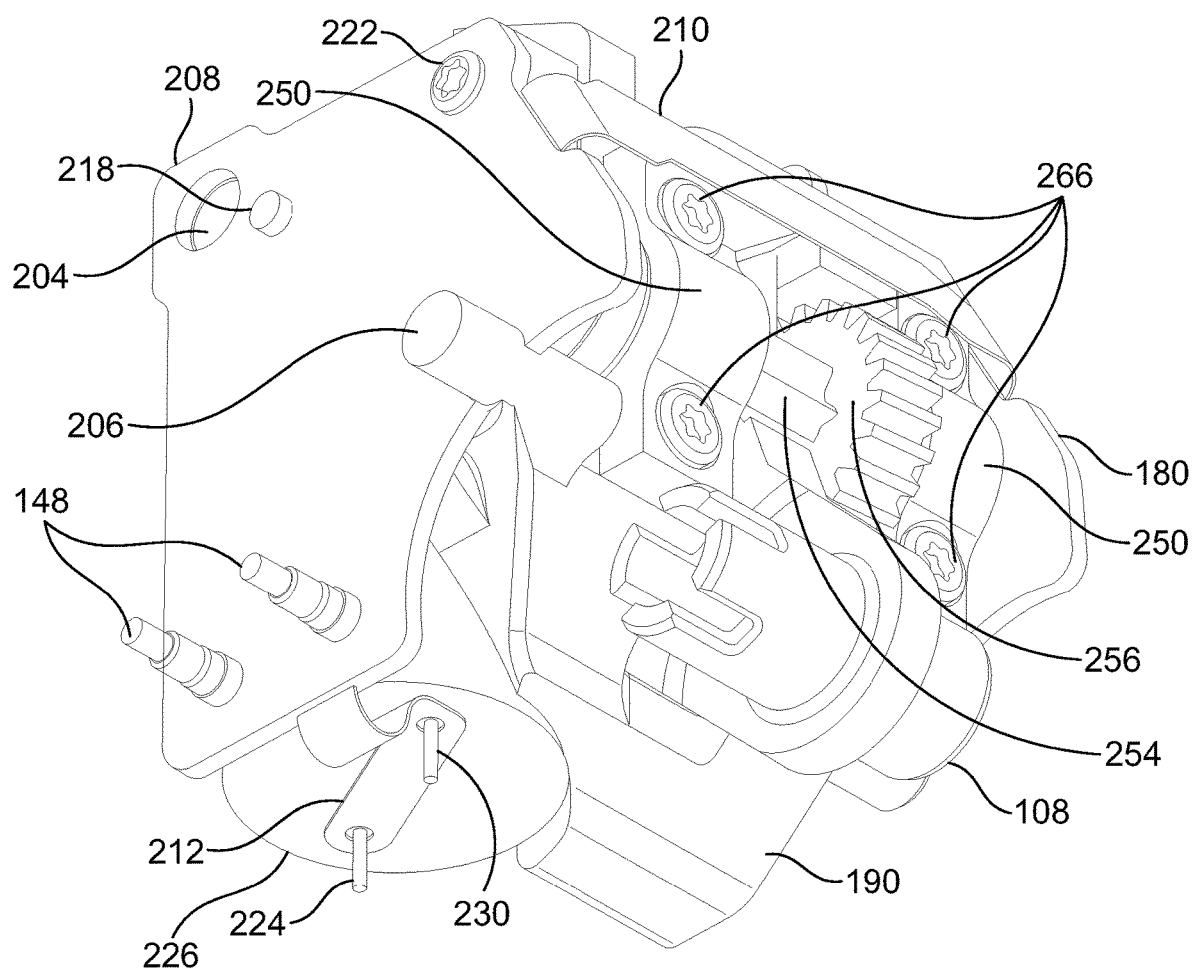
FIG. 16 is an isometric view of the motor gearbox inner assembly showing electrical connection between the PC board and the motor.

Referring to FIGS. 14, 15, and 16, PC board assembly 152 may be a rigid-flex PCB comprised of two flat rigid sections, front board 180 and rear board 208 and two flexible sections, flex circuit 210 and motor terminal flex circuit 212, which extend directly from the sides of the rigid sections to eliminate the need for connectors. Front PCB mounting screw 214 is received in a clearance thru hole on front board 180 and threadably engages main inner housing 190 to fix front board against the front face of main inner housing in an orientation such that flex circuit 210 extends outboard. Flex circuit 210 is bent 90° rearward immediately after extending past the side of front board 180, runs along the length of motor gearbox inner assembly 188 and again bends 90° inboard. Flex circuit 210 then immediately terminates into the side of rear board 208. Rear outboard alignment boss 206 on main inner housing 190 is received in rear outboard alignment hole 216 and rear PCB alignment boss 218 is received in rear inboard alignment hole 220 to orient rear board 208 relative to the main inner housing. Rear PCB mounting screw 222 is received in a clearance thru hole in rear board 208 and threadably engages main inner housing 190 to fix rear board 208 against the rear face of main inner housing 190.

Referring to FIG. 16, motor terminal flex circuit 212 extends from the bottom side edge of rear board 208 and bends forward until positive motor terminal 230 and negative motor terminal 224 of motor 226 are received in clearance thru holes in motor terminal flex circuit 212. The surface of motor terminal flex circuit 212 immediately surrounding the clearance thru holes are solder pads that create a continuous electrically conductive pathway between the terminals in motor 226 and the circuits in PC board assembly 152 when solder is applied in a conventional manner between the pads and terminals.

Figure 17:
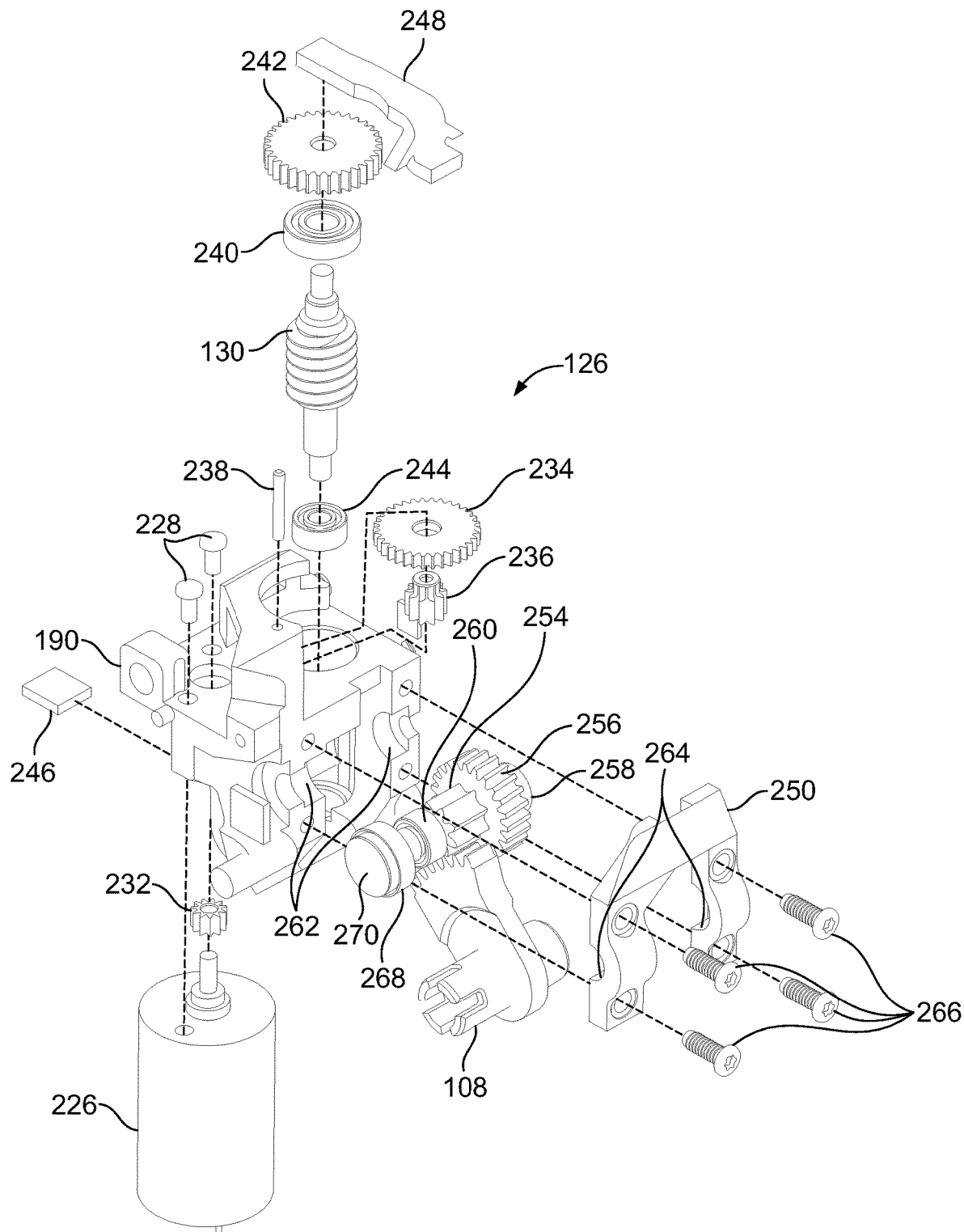
FIG. 17 is an exploded view of the motor gearbox inner assembly.
Figure 18:
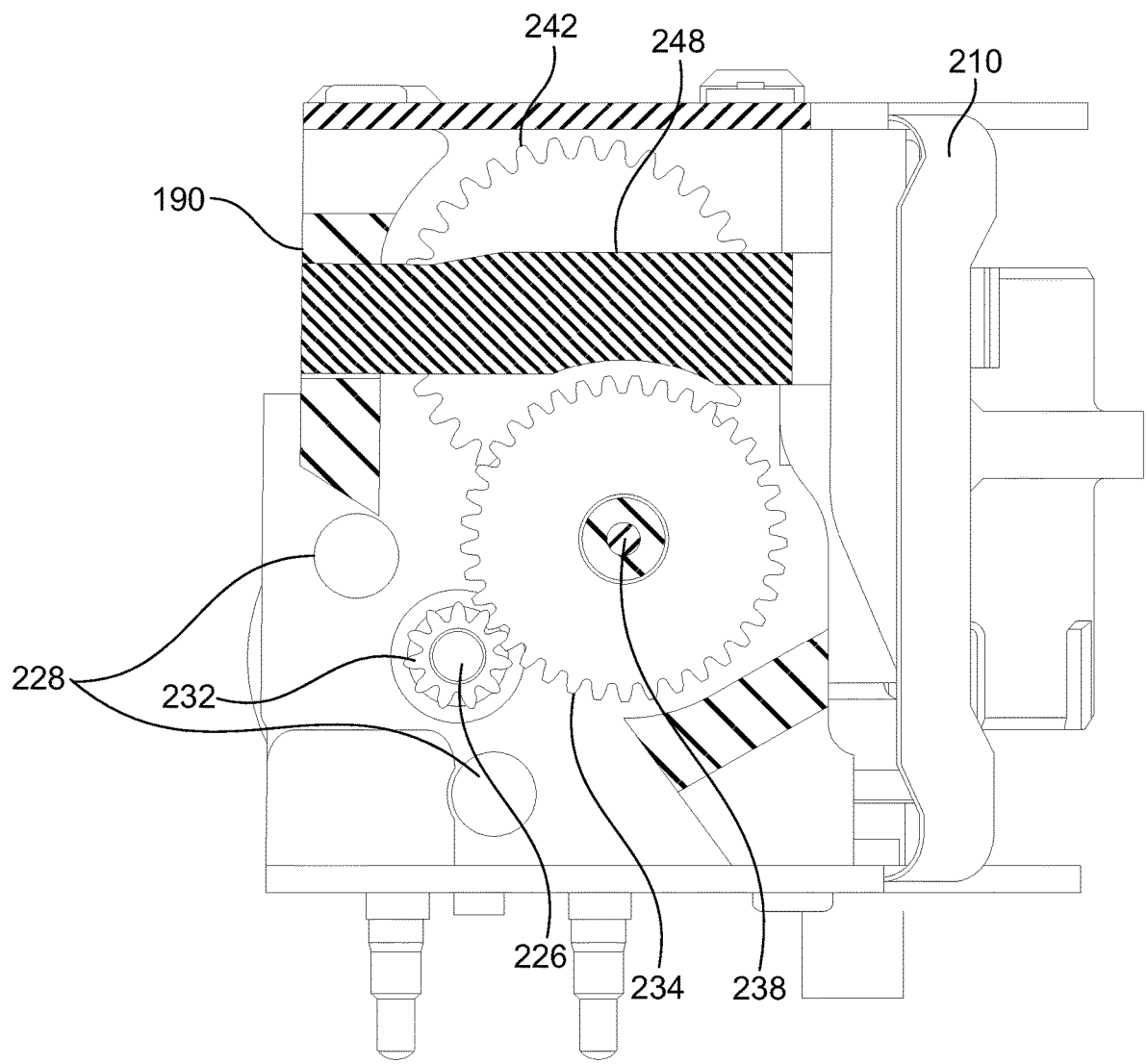
FIG. 18 is a section view along 18-18 of FIG. 15A showing stage one of the gear train.

Referring to FIGS. 17 and 18, motor 226 is rigidly fixed to main inner housing 190 by two motor screws 228 that are received in clearance thru holes in main inner housing and threadably engaged to blind holes on the motor. The two threaded holes on motor 226 may be spaced 150° apart, for example, on its bolt circle diameter so that the motor can be installed in one orientation relative to main inner housing 190. This prevents any ambiguity regarding the locations of positive motor terminal 230 and negative motor terminal 224 in the assembly. Gear train or transmission 126, some or all of which is located and supported by the main inner housing 190, includes stage one pinion 232 fixed to the output shaft of motor 226 either by press fit or an adhesive. Stage one gear 234 and stage two pinion 236 are press fit together in a conventional manner that is well known in the gear making industry and are located in main inner housing 190 such that stage one gear 234 is meshed with stage one pinion 232. A thru hole extends through wall of main inner housing 190 above stage one gear 234 and a blind hole extends through a wall of the main inner housing below stage two pinion 236. Both holes are concentric with the center bore of stage two pinion 236. Second gear axle 238 is press fit in the thru hole in main inner housing 190 and is rotatably received in the thru hole in stage two pinion 236. A distal end of second gear axle 238 is press fit into the blind hole main inner housing 190. The assembly of stage one gear 234 and stage two pinion 236 can rotate about second gear axle 238 but its translational location relative to the rest of motor gearbox inner assembly is limited by the two walls on main inner housing 190. Thus, torque from the output shaft of motor 226 is able to be transferred to stage two pinion 236.

Figure 19:
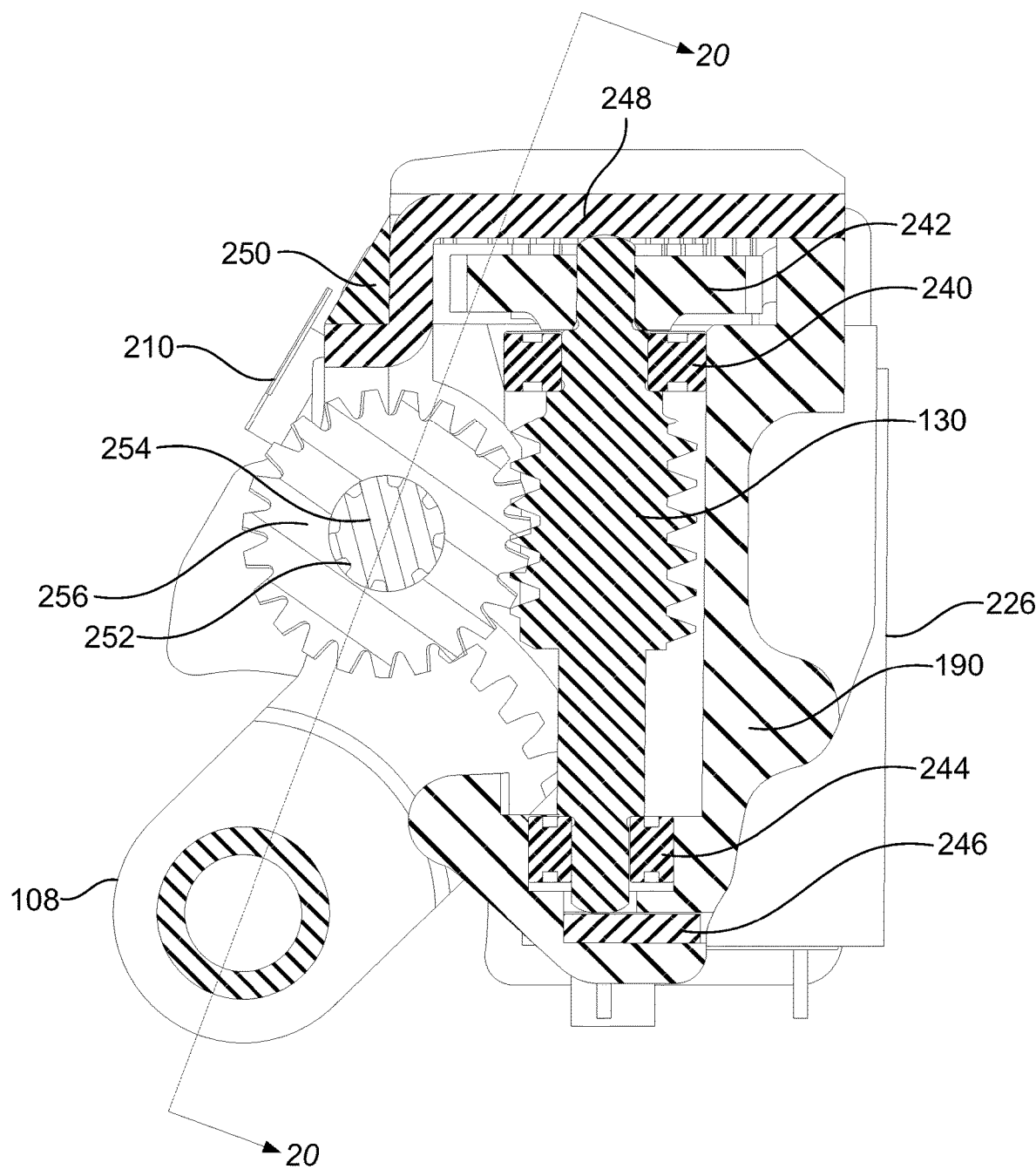
FIG. 19 is a section view along 19-19 of FIG. 15A showing stage three of the gear train.

Referring to FIGS. 17 and 19, center bore of worm upper bearing 240 rotatably receives a shaft on one end of stage three worm 130. Center bore of stage two gear 242 is press fit onto a portion of shaft of stage three worm 130 above worm upper bearing 240, as shown in FIG. 19, and thus torque is allowed to transfer between the two parts. The center bore of worm lower bearing 244 rotatably receives a shaft on the other end of stage three worm 130. The outer diameters of worm upper bearing 240 and worm lower bearing 244 are press-fit into bores in main inner housing 190 and stage two gear 242 is located in such a manner that stage two gear 242 is meshed with stage two pinion 236. Worm bottom thrust plate 246 may be made of an aluminum material and is either pressed or co-molded into a slot in main inner housing 190 immediately below stage three worm 130. Worm top thrust plate 248 may be made of an aluminum material and its either press fit into a slot or co-molded in main inner housing 190. A second end of worm top thrust plate 248 is clamped down by worm wheel cover 250 to rigidly fix the worm top thrust plate to main inner housing 190. Worm bottom thrust plate 246 and worm top thrust plate 248 engage stage three worm on either end and limit its movement along is long axis. Thus, torque from stage two pinion 236 is able to be transferred to stage three worm 130. Also, the worm wheel cover 250 and worm top thrust plate 248 may be made as a one-piece construction.

Figure 20:
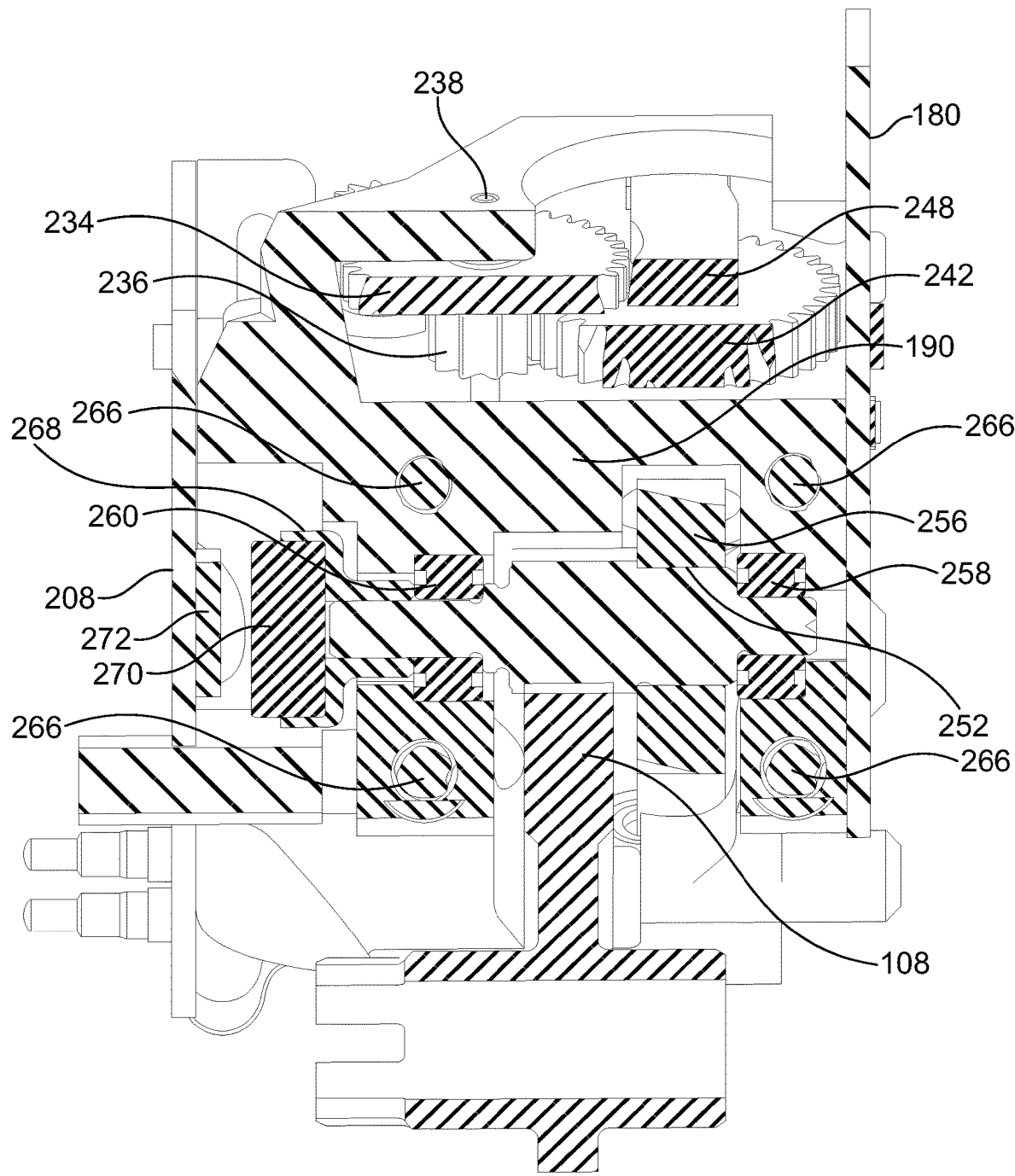
FIG. 20 is a section view along 20-20 of FIG. 19 showing stage four of the gear train.

Referring to FIGS. 17, 19, and 20, a splined shaft 252 of stage four pinion 254 is press fit into the center bore of stage three worm wheel 256, which is positioned in such a way to mesh with stage three worm 130. Thus torque from stage three worm 130 is able to be transferred to stage four pinion 254. In front of stage three worm wheel 256 as shown in FIG. 20, the shaft of stage four pinion 254 is rotatably received in the center bore of front worm wheel bearing 258. The shaft of stage four pinion 254 behind the gear teeth section as shown in FIG. 20 is rotatably received in the center bore of rear worm wheel bearing 260. Front worm wheel bearing 258 and rear worm wheel bearing 260 are rotatably received in semicircular bearing cutouts 262 in main inner housing 190. Worm wheel cover 250 has two corresponding semicircular cutouts 264 that also receive front worm wheel bearing 258 and rear worm wheel bearing 260. Four worm wheel cover screws 266 are received in clearance thru holes in worm wheel cover 250 and threadably engaged with main inner housing 190 to rigidly fix worm wheel cover 250 to main inner housing 190, completing the circular cutouts that position front worm wheel bearing 258 and rear worm wheel bearing 260. The shaft at the end of stage four pinion 254 is press fit into the center bore of magnet holder 268 and magnet 270 is press fit into magnet holder 268. Alternatively, the magnet 270 may be slip-fit into holder 268 with a suitable adhesive. Thus, stage four pinion 254, stage three worm wheel 256, magnet holder 268, and magnet 270 are all rotatable together as a unit about the long axis of stage four pinion 254. The exposed face of magnet 270 is parallel to the surface of rear board 208 and the center axis of magnet 270 is concentric with the center of a magnetic rotary encoder chip 272 mounted on the surface of rear board 208. Sector gear 108 is positioned in such a way that it is meshed with stage four pinion 254 and torque is able to be transferred between the two parts. Thus, torque from motor 226 is able to be transferred to sector gear 108.

The radio 274 (FIG. 14) (e.g., any device or devices capable of wirelessly transmitting and/or receiving signals) of PC board assembly 152 periodically listens for wireless shift signals or other commands from the shift units (not shown). The radio 274 may be positioned on the front board 180 of PC board assembly 152. It is believed that positioning the radio 274 in this position within the front housing portion 52 will maximize its ability to receive and resolve signals. In addition, the housing portions 50, 52 may be made of a material that is relatively transparent to wireless signals, such as plastic. This is somewhat contrary to common practice, where derailleur parts are typically made of metal for its stiffness and strength.

When a wireless shift signal is received by the radio 274 of PC board assembly 152, the radio forwards the shift signal to a processor (CPU 276), and a PID control loop (proportional-integral-derivative controller) may be used to manage a flow of electrical power from power supply 42 through battery contact pins 148 and PC board assembly 152 to motor 226. It will be understood, in general, that the CPU 276 interprets the shift and other signals received by the radio 274 and generates an output that controls the motor 226.

The output shaft of motor 226 rotates either clockwise or counterclockwise depending on the output from the CPU 276, the result, for example, depending on whether an upshift or a downshift is desired or whether a trim function is desired. The resulting rotation of stage one pinion 232 causes rotation of stage one gear 234, which rotates together with stage two pinion 236 to rotate stage two gear 242, which rotates together with stage three worm 130 to rotate stage three worm wheel 256, which rotates together with stage four pinion 254 to rotate sector gear 108. Output gear 108 moves output arm 106, which receives the output of gear train or transmission 126. The output arm 106 may be considered an element of the transmission 126, but in the illustrated embodiment extends outside of the housing 48.

In the case that a upshift (i.e. a shift to the larger chainring) is desired, castellations of sector gear 108 drive motor gearbox module output arm 106 clockwise around first link pin 72 in FIG. 5, which in turn drives upper limit set screw 116 along with outer link 56 clockwise, causing inner link 58 and chain guide 60 to move outboard towards the larger chainring. As chain guide 60 moves outboard, the magnetic rotary encoder chip on PC board assembly 152 in combination with magnet 270 is used to monitor the angular position of stage four pinion 254 and when the position of stage four pinion 254 corresponding to the desired chainring has been reached, power to the motor 226 is shut off, since chain guide 60 is aligned with the desired chainring. As previously described, second biasing element 128 eliminates any play or backlash in the drive gear train or transmission 126, ensuring that chain guide 60 is accurately and repeatably positioned. In the case that a downshift (i.e. a shift to a smaller chainring) is desired, castellations of sector gear 108 rotate motor gearbox module output arm 106 counterclockwise around first link pin 72 in FIG. 5, which in turn drives saver spring 112 along with outer link 56 counterclockwise, causing inner link 58 and chain guide 60 to move inboard towards the smaller chainring. As chain guide 60 moves inboard, the magnetic rotary encoder chip on PC board assembly 152 along with magnet 270 are used to monitor the position of stage four pinion 254 and when position of stage four pinion 254 corresponding to the desired chainring has been reached, power to the motor 226 is shut off, since chain guide 60 is aligned with the desired chainring. As previously described, second biasing element 128 eliminates any play or backlash in the drive gear train or transmission 126, ensuring that chain guide 60 is accurately and repeatably positioned.

After a period of inactivity (e.g., no shift signals received), most of the electronic systems of PC board assembly 152 may be configured to shut down to conserve power. During this time, the radio 274 is shut down (changed to a low power or unpowered condition) and cannot receive shift signals. A vibration sensor is provided on PC board assembly 152 in communication with the CPU 276 that causes the electronic systems of PC board assembly, including the radio 274, to turn on again when vibration is detected. The vibrations that naturally occur while riding the bicycle caused by the interaction of the road with the bicycle and by the interaction of the bicycle's various components with each other are sufficiently strong to activate the vibration sensor and prevent the electronic systems of PC board assembly 152 from shutting down. But when the bicycle is not being ridden, i.e. parked, the vibration sensor does not detect any vibration and most of the electronic systems of PC board assembly 152 are shut down to conserve power after a predetermined amount of time. As soon as the rider makes contact with the bicycle, the resulting vibration activates the vibration sensor, turning the electronic systems on again. The vibration sensor may be a SignalQuest SQ-MIN-200 or a Freescale Semiconductor MMA8451Q.

Figure 21:
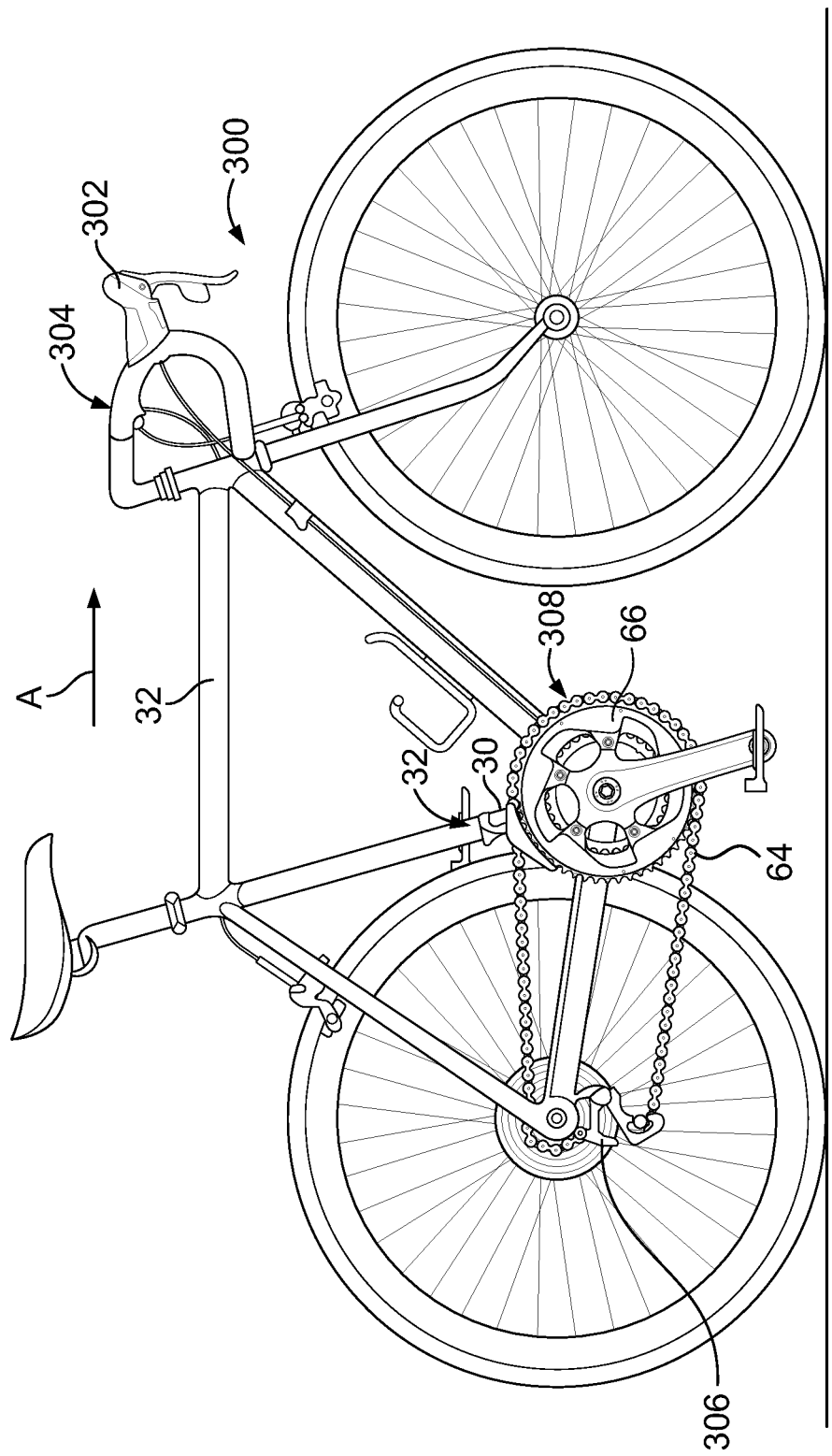
FIG. 21 is a side view of a bicycle including an embodiment of an electromechanical front gear changer according to the invention.

Referring to FIG. 21, a bicycle 300 with a drop-bar type handlebar 304 is shown in accordance with one embodiment of the invention. The bicycle 300 includes at least one brake hood/lever 302 mounted to the handlebar 304 attached to the bicycle. The bicycle 300 may have one or both of an electromechanical front gear changer 30 and an electromechanical rear gear changer 306 mounted to the bicycle frame 32 part of the bicycle. The gear changers 30, 306 may be derailleurs, for example. The bicycle may include a control system, as detailed above, at least partially disposed in the hood 302, for controlling the gear changers 30, 306. The bicycle 300 will typically have a drive assembly 308 with one or more front chainrings 66 connected to a plurality of rear sprockets by a chain 64 as is known in the art. The front and forward direction is indicated by the direction of arrow "A".

While this invention has been described by reference to particular embodiments, it should be understood that numerous changes could be made within the spirit and scope of the inventive concepts described. Accordingly, it is intended that the invention not be limited to the disclosed embodiment, but that it have the full scope permitted by the language of the following claims.

The invention claimed is:

1. An electromechanical front derailleur for a bicycle having a chain and one or more shift units, comprising:
   a base member attachable to the bicycle;
   a printed circuit board assembly (PCBA) supported by the base member;
   a linkage movably coupled to the base member;
   a chain guide movably coupled to the linkage for contacting the chain;
   a motor supported by the base member;
   a gear transmission driven by the motor to move the linkage;
   a processor for controlling the motor;
   a power supply powering at least one of the motor and the processor;
   a wireless communicator on the PCBA; and
   an electrical switch supported by the base member in operative communication with the processor configured to cause a first change of state of the electromechanical front derailleur and to cause a second change of state of the electromechanical front derailleur, wherein the first change of state pairs the electromechanical front derailleur with the one or more shift units and the second change of state causes the chain guide to produce a change of position, and wherein the first change of state and the second change of state are executed independently of each other.

2. The electromechanical front derailleur of claim 1, wherein the electrical switch is activated by a button on the base member.

3. The electromechanical front derailleur of claim 1, configured such that the change of position causes the chain guide to trim.

4. The electromechanical front derailleur of claim 1, configured such that the change of position causes a gear shift.

* * * * *